US011901676B2

(12) United States Patent
Mathias

(10) Patent No.: US 11,901,676 B2
(45) **Date of Patent: *Feb. 13, 2024**

(54) COUPLING DEVICE FOR SHORT-CIRCUIT PROTECTION

(71) Applicant: HARTING Stiftung & Co. KG, Espelkamp (DE)

(72) Inventor: David Mathias, Easley, SC (US)

(73) Assignee: HARTING Stiftung & Co. KG, Espelkamp (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,363

(22) Filed: May 4, 2022

(65) Prior Publication Data

US 2022/0263277 A1 Aug. 18, 2022

Related U.S. Application Data

(63) Continuation of application No. 17/381,438, filed on Jul. 21, 2021, now Pat. No. 11,362,468.

(Continued)

(51) Int. Cl.

*H01R 13/688* (2011.01)
*H01R 13/717* (2006.01)

(Continued)

(52) U.S. Cl.

CPC ....... *H01R 13/688* (2013.01); *H01R 13/5221* (2013.01); *H01R 13/7175* (2013.01); *H01R 13/04* (2013.01)

(58) Field of Classification Search

CPC .............. H01R 13/688; H01R 13/5221; H01R 13/7175; H01R 13/04; H01R 31/065; H01H 85/545; H01H 85/547

See application file for complete search history.

(56) References Cited

U.S. PATENT DOCUMENTS 4,568,137 A * 2/1986 Leuthold .............. H01H 85/547 337/213
4,990,723 A * 2/1991 Ziberna ................ H01R 13/748 174/152 R (Continued)

FOREIGN PATENT DOCUMENTS

FR 2829872 A1 3/2003

OTHER PUBLICATIONS

Phoenix Contact—Fast Field Wiring with M8 and M12 Connectors video; https://www.youtube.com/watch?v=I0qCPqzwbpE; Publication Date Nov. 9, 2010.

(Continued)

*Primary Examiner* — Travis S Chambers
(74) *Attorney, Agent, or Firm* — Smartpat PLC

(57) ABSTRACT

A coupling device is provided having a first connector with a first primary pin and a second primary pin. The coupling device also defines a first recess and a second recess. The first recess is configured to receive a first component selected from the group consisting of a fuse or a jumper, and the second recess is configured to receive a second component selected from the group consisting of a fuse or a jumper. The first recess is closed when the first component is received in the first recess. When the first recess is closed, the first component forms part of a first electrical circuit with the first primary pin. Additionally, the second recess is closed when the second component is received in the second recess. When the second recess is closed, the second component forms part of a second electrical circuit with the second primary pin.

13 Claims, 24 Drawing Sheets

Related U.S. Application Data

(60) Provisional application No. 63/121,612, filed on Dec. 4, 2020.

(51) Int. Cl.

| | |
|---|---|
| ***H01R 13/52*** | (2006.01) |
| *H01R 13/04* | (2006.01) |

(56) References Cited

U.S. PATENT DOCUMENTS

| | | | | |
|---|---|---|---|---|
| 5,316,502 | A * | 5/1994 | Loet | H01H 85/205 439/620.26 |
| 5,969,587 | A | 10/1999 | Combas | |
| 6,157,287 | A | 12/2000 | Douglass et al. | |
| 6,315,104 | B1 | 11/2001 | Ebert | |
| 6,530,811 | B1 * | 3/2003 | Padulo | H01H 73/08 439/82 |
| 6,650,222 | B2 | 11/2003 | Darr et al. | |
| 6,784,783 | B2 * | 8/2004 | Scoggin | H01H 85/547 337/194 |
| 8,715,008 | B2 | 5/2014 | Von Zur Muehlen | |
| 8,882,546 | B2 | 11/2014 | Machado et al. | |
| 9,325,122 | B1 * | 4/2016 | Goyal | H01R 43/20 |
| 9,768,572 | B1 * | 9/2017 | Gelineau | H02G 3/105 |
| 9,923,288 | B2 | 3/2018 | Bertrand et al. | |
| 9,982,875 | B2 | 5/2018 | Stevens | |
| 10,886,089 | B2 * | 1/2021 | Brakefield | H01H 85/22 |
| 11,362,468 | B1 * | 6/2022 | Mathias | H01R 13/688 |
| 2004/0196607 | A1 | 10/2004 | Didier | |
| 2008/0117568 | A1 | 5/2008 | Reed et al. | |
| 2012/0034809 | A1 | 2/2012 | Reimchen | |
| 2014/0113500 | A1 * | 4/2014 | Goyal | H02S 40/36 439/698 |

OTHER PUBLICATIONS

Heilind Electronics—TE M8/M12 Connector System; https://www.youtube.com/watch?v=aGnZYvzg_9o; Publication date Aug. 17, 2017.

International Search Report and Written Opinion for International application No. PCT/US2021/061193 dated Jan. 5, 2022; 10 pages.

* cited by examiner

COUPLING DEVICE FOR SHORT-CIRCUIT PROTECTION

CROSS-REFERENCE TO RELATED APPLICATIONS

This application is a continuation of U.S. patent application Ser. No. 17/381,438 entitled "Coupling Device for Short-Circuit Protection," filed Jul. 21, 2021, which claims the benefit of U.S. Provisional Application No. 63/121,612 entitled "inFused Coupler," filed Dec. 4, 2020 all of which are incorporated herein in their entirety.

FIELD OF THE DISCLOSURE

The present disclosure relates to devices, systems, and methods for selectively providing short-circuit protection to new and existing systems.

BACKGROUND OF THE DISCLOSURE

The current process for supplying short circuit protection for a circuit in the industrial automation field, primarily for protecting the chassis of a Programmable Logic Controller (PLC) or Programmable Automation Controller (PAC) rack and associated inputs and outputs (I/O), is provided by using a separate fused terminal block for each signal or power wire. Previously, in order to provide short circuit protection, a user would execute certain methods to do so. A user would first add fused terminal blocks inside of an industrial control panel. Second, the user would modify the wiring to be connected to the new terminal blocks. Third, the user would need to cut the wiring for the existing circuit. Fourth, the user would need to need to solder or crimp a special "in-line" fuse holder to add short circuit protection.

In executing the method described above, the user would be required to add a fused terminal block for each signal to be protected. Thus, fora standard M12 cable, there would be four (4) fused terminal blocks required for each cable. This approach increases the burden on the user in assembling and using the system. Additionally, because four (4) fused terminal blocks were required, these terminal blocks would increase the footprint of the installed short circuit protection system.

Additionally, existing systems often lack any indicator to show when any circuit is blown. This increases the burden on the user and causes the user to frequently inspect the fuses to ensure that the fuses are still in working order.

BRIEF SUMMARY OF THE DISCLOSURE

Several embodiments described herein are related to a coupling device that may mitigate any damage to a Programmable Logic Controller (PLC) or Programmable Automation Controller (PAC) in the event of a short circuit condition existing at a connected field device. Daedalus Industrial provides such a coupling device in the form of its DaedaCoupler™. Multiple conductors may be provided in a multi-conductor cable, and these conductors may be provided on a standard M12 size connectors. Several example coupling devices described herein offer a single device providing short circuit protection for the multiple conductors within a multi-conductor cable. These industry standard connectors are readily available and offered by multiple manufacturers in the electrical market. Example coupling devices may easily adapt to standard M12 (12 mm) sized round connectors that have either been previously installed or have not yet been installed. An example coupling device may be electrically connected between a pre-molded M12 connector and signal source power to provide short circuit protection.

The connectors of some example coupling devices may easily screw into respective receptacles. Additionally, to provide field device protection, example coupling devices can also be used to provide short circuit protection for up to four (4) separate control circuits between devices or enclosures. If it is determined by the user that it is not required to provide short circuit protection for any conductor in the cable, a simple jumper can be used in the place of the push-in fuse. This jumper may act as a conductor, and the jumper may be configured to enable current to flow through the jumper.

Example coupling devices may include a standard pinout configuration. For example, a 5-pin configuration may be used in some embodiments, with four primary pins and one ground pin. Thus, certain coupling devices are capable of being readily substituted into existing systems to provide additional short circuit protection. These coupling devices may provide short circuit protection at a low cost, and the coupling devices are easy to assemble and use. The coupling devices may be easily connected and removed. Additionally, various coupling devices described herein avoid the need for four fused terminal blocks, so the size of a panel containing the coupling device may be reduced.

Indicators may be provided in some embodiments on an external surface of a coupling device. The indicators are often provided as lights or LED lights, and these indicators may extend across multiple faces in some embodiments so that the indicator can be seen from an increased range of angles. The indicator may be activated or illuminated when the fuse is "open" or "blown" to alert the user. When the indicator is not activated, the fuse may be in working order. Indicators may permit a user to easily troubleshoot and locate "blown" fuses without the need to open any enclosure drawer. In some embodiments, one indicator is provided for each drawer.

The coupling device may be configured to easily adapt and connect to a wide variety of devices. For example, the coupling device may be connected between a device and a source, or the coupling device may be connected between two cables in some embodiments. The coupling device may possess common connection interfaces such as an M12 plug, permitting the coupling device to be easily added into existing systems. Thus, the coupling device is easy to "plug and play" into existing systems to add short circuit protection as desired. Users may implement the coupling device into systems without the need for any tools, making the device easy to use. The coupling device may be installed into existing systems without any additional wiring required and without any wire modifications required.

Drawers are also described herein that may allow a fuse or a jumper to be easily added or removed from the coupling device. The drawer may possess an alignment slot defining a recess, and the drawer may be configured to receive at least one of a fuse or a jumper within the recess defined within the alignment slot. The drawer may be configured to shift between an opened state and a closed state in the coupling device. In the closed state, the drawer may be secured in the coupling device, and the drawer may be configured to position the fuse or the jumper so that the fuse or the jumper completes an electrical circuit. In the opened state, the drawer is not secured in the coupling device, and fuse or the jumper may be removed from the drawer in this opened state. Drawers may also have a locking clip and a locking clip receiver that are configured to engage with each other to lock a fuse or a jumper within the drawer.

In an example embodiment, a coupling device is provided. The coupling device comprises a first connector with one or more primary pins and one or more drawers. The one or more drawers are configured to receive at least one of a fuse or a jumper. The one or more drawers are configured to be opened to permit the fuse or the jumper to be added or removed. Additionally, the coupling device defines one or more recesses, and the one or more drawers are configured to be inserted into a recess of the one or more recesses to place the drawer in a closed state. In the closed state, the fuse or the jumper form part of an electrical circuit. In some embodiments, the drawers may each contain a door and a tab extending from the door.

In some embodiments, the coupling device may further comprise one or more indicators, and each indicator of the one or more indicators may be configured to alert a user when a circuit is in an opened state. In some related embodiments, the indicator may be configured to alert a user when a fuse is blown. In some related embodiments, the indicator is an LED light such as a red LED light.

In some embodiments, the first connector may be a female connector. In some embodiments, the coupling device may further comprise a second connector, and the first connector and the second connector may extend about the same central axis. In some embodiments, the coupling device may be configured to be secured to a DIN rail mount, or the coupling device may be configured to be secured to a bulkhead connector.

In another example embodiment, a drawer for housing a fuse or a jumper is provided. The drawer comprises a door, a tab, and a body. The tab extends outwardly from the door, and the body has an alignment slot that defines a recess. The drawer is configured to receive at least one of a fuse or a jumper within the recess defined within the alignment slot.

In some embodiments, the drawer further comprises a locking member. In some related embodiments, the drawer further comprises a locking clip on the locking member and a locking clip receiver on at least one of the body or the door, and the locking clip is configured to engage with the locking clip receiver to secure the fuse or the jumper in the recess. In other related embodiments, the drawer further comprises a locking clip on at least one of the body or the door and a locking clip receiver on the locking member, and the locking clip is configured to engage with the locking clip receiver to secure the fuse or the jumper in the recess.

In some embodiments, the drawer further comprises a hinge, and the locking member is configured to rotate about the hinge.

Other features of the present invention and combinations of features will become apparent from the detailed description to follow, taken in conjunction with the accompanying drawings.

BRIEF DESCRIPTION OF THE SEVERAL VIEWS OF THE DRAWING(S)

For the purpose of illustrating the invention, the drawings show forms that are presently preferred. It should be understood that the invention is not limited to the precise arrangements and instrumentalities shown in the drawings.

DETAILED DESCRIPTION OF THE DISCLOSURE

Various embodiments described herein are related to a coupling device. For FIGS. 1-3, 4A-4E, 5A-5E, 6A-6D, 7A-7C, 8A-8C, and 9A-9B and the corresponding discussion, like reference numbers are intended to refer to similar features. For example, reference numbers 318, 418, 518, and 618 each refer to a drawer.

Figure 1:
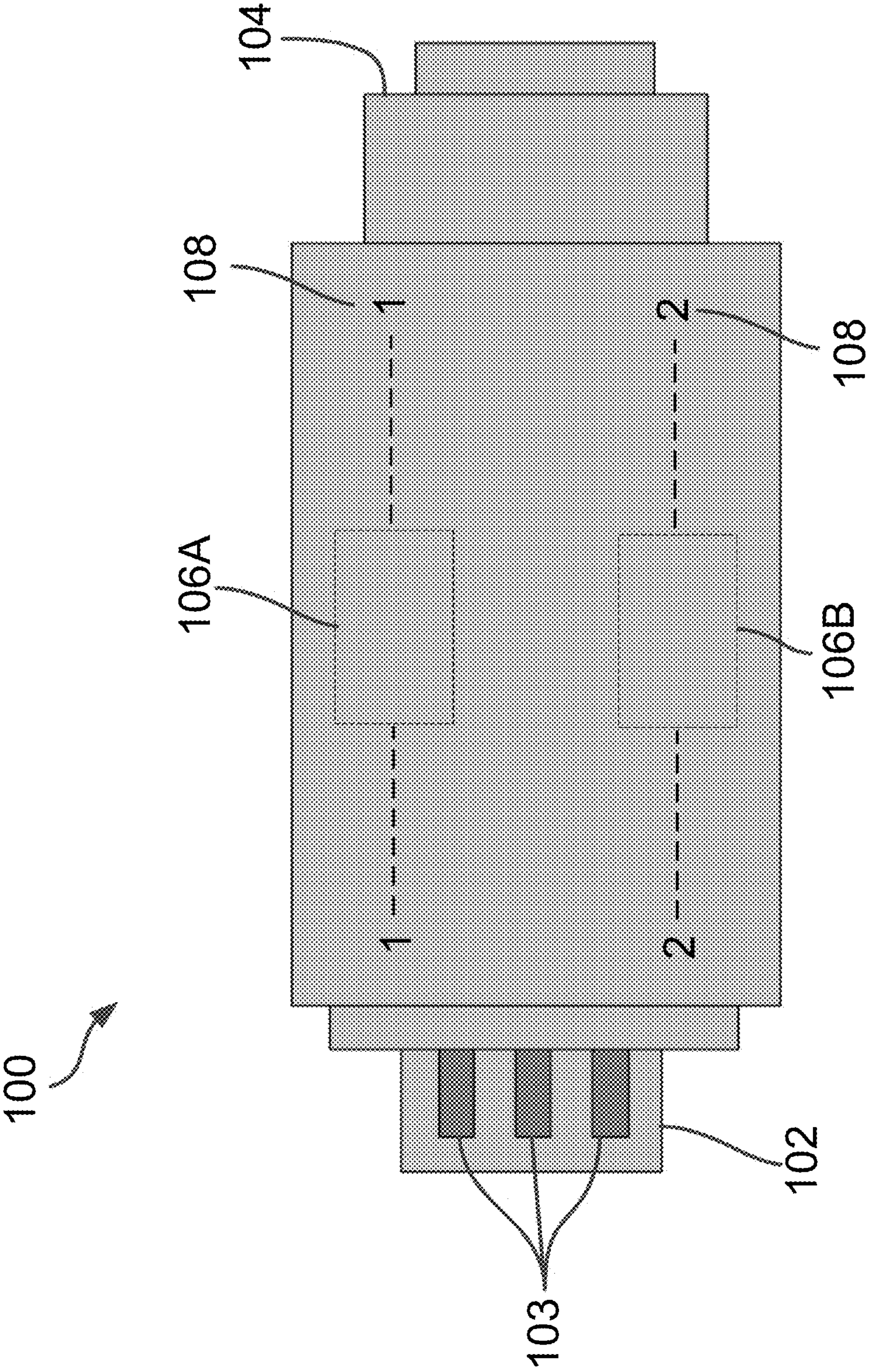
FIG. 1 illustrates a schematic view of an example coupling device, in accordance with some embodiments herein.

FIG. 1 illustrates a schematic view of an example coupling device 100, in accordance with some embodiments herein. The coupling device 100 may include a first connector 104. The first connector 104 may be a female connector in some embodiments. However, in some embodiments, the first connector 104 may be provided as a male connector, or it may be provided in another form. The first connector 104 may include one or more pins as well, with three, four, or five pins being used in most embodiments. The first connector 104 may be configured to receive a field device cable or another device.

The coupling device 100 may also include a second connector 102. In the illustrated embodiment, the second connector 102 is a male connector, but the second connector 102 may be provided as a female connector, or it may be provided in another form. The second connector 102 may have one or more pins 103. For example, a second connector with three, four, or five pins 103 may be used. The second connector 102 may be configured to be received within a bulkhead or another connector (e.g. a female connector) that is wired to a programmable logic controller (PLC) input/output (I/O) card.

The coupling device 100 may be configured to receive a fuse at one or more locations within the coupling device. FIG. 1 illustrates fuses within the example coupling device 100, including a first fuse 106A and a second fuse 106B. The fuses 106A, 106B may be configured to protect other electrical components within any formed circuit. For example, where the amount of current flowing through a formed circuit is too high, then this may potentially result in damage to electrical components within the circuit. The fuses 106A, 106B may be configured to blow once the current exceeds a given threshold, protecting the other electrical components in the circuit. While only a first fuse 106A and a second fuse 106B are illustrated in FIG. 1, additional fuses may be provided in other embodiments. In some embodiments, only one fuse may be used. Multiple fuses may be provided in the same electrical circuit in some embodiments. Once a fuse is blown, the fuse may be removed and replaced.

In some cases, a jumper may be used instead of a fuse. This may occur, for example, where an operator does not wish to provide increased protection for the circuit at a given location. Pin number identifiers 108 may also be used to indicate the fuse location.

Figure 2:
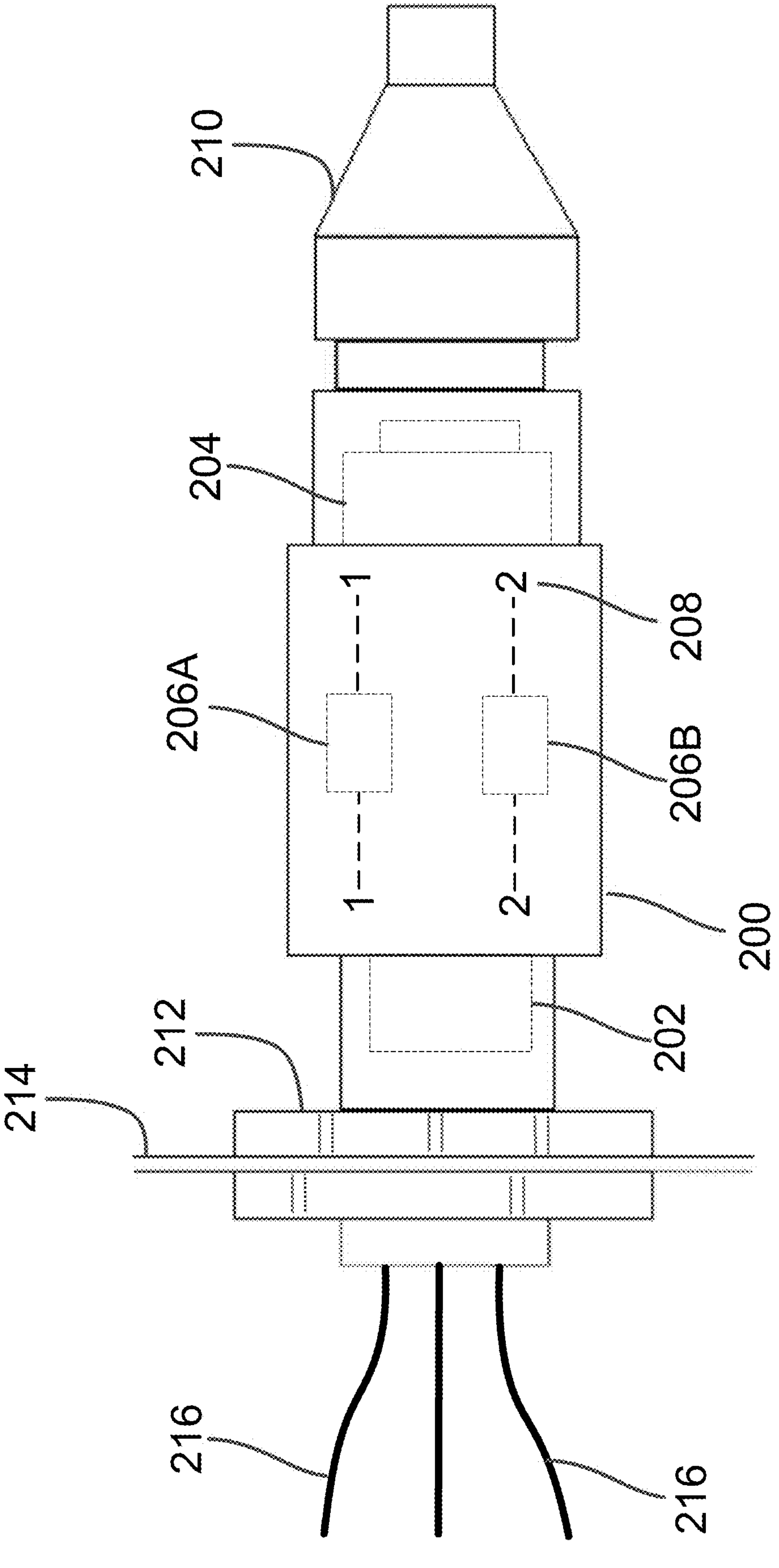
FIG. 2 illustrates a schematic view of an example coupling device secured to an interface, in accordance with some embodiments herein.

The coupling devices of the embodiments described herein may be connected to cables, devices, bulkhead connectors, and other components. FIG. 2 illustrates a schematic view of an example coupling device 200 secured to an interface 212, in accordance with some embodiments herein. The example coupling device 200 is similar to the coupling device 100 illustrated in FIG. 1. The coupling device 200 has a first connector 204, a second connector 202, a first fuse 206A, a second fuse 206B, and pin number identifiers 208. Each of these features are similar to the corresponding features discussed above in reference to the coupling device 100.

The first connector 204 may be configured to be connected to a cable 210. In the illustrated embodiment, the cable 210 is a male field device cable. In some embodiments, the first connector 204 may be connected to one or more intermediary components, and the intermediary components may be connected to the cable 210. Similarly, the second connector 202 may be configured to be connected to an interface 212. The interface 212 may be secured to and/or integral with a panel 214. In the illustrated embodiment, the interface 212 is a bulkhead connector, but other interfaces or connectors may be used as well. In some embodiments, the second connector 202 may be connected to one or more intermediary components, and the intermediary components may be connected to the interface 212. One or more wires 216 may be connected to the interface 212. These wires 216 may terminate at an input/output (I/O) point of a programmable logic controller (PLC) chassis. These wires 216 may be flying lead wires in some embodiments.

Figure 3:
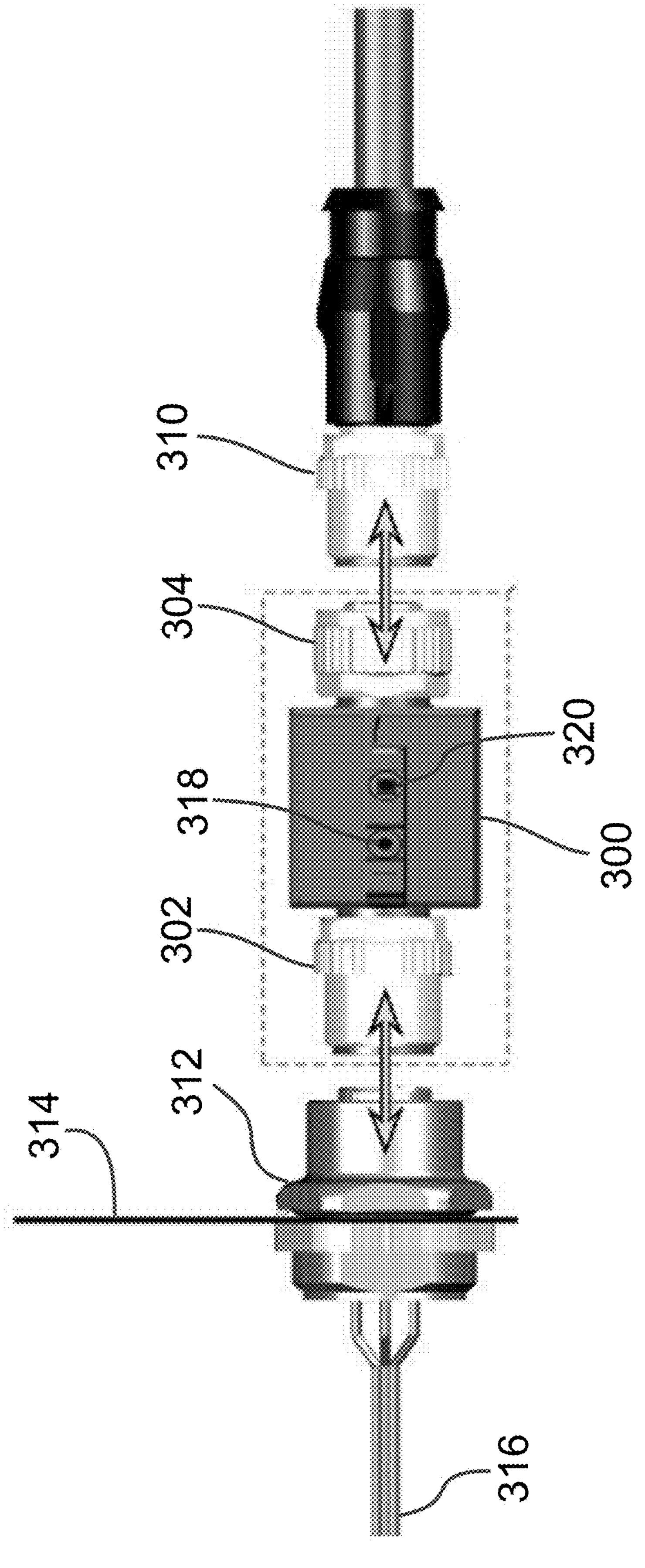
FIG. 3 illustrates another schematic view of an example coupling device secured to an interface, in accordance with some embodiments herein.

FIG. 3 illustrates another schematic view of an example coupling device 300 secured to an interface 312, in accordance with some embodiments herein. This coupling device 300 is similar to the coupling device 100 of FIG. 1 and the coupling device 200 of FIG. 2 in several respects. Like the previously discussed coupling devices 100, 200, the coupling device 300 may include a first connector 304 and a second connector 302. The second connector 302 may connect to a cable 310 or another intermediary component, and the first connector 304 may connect to the interface 312. The interface 312 may be a bulkhead connector, and the interface 312 may be secured to and/or integral with a panel 314. One or more wires 316 may be connected to the interface 312. These wires 316 may terminate at an input/output (I/O) point of a programmable logic controller (PLC) chassis.

FIG. 3 also illustrates a drawer 318. This drawer 318 may hold a fuse 922 (see FIG. 9A) or a jumper 975 (see FIG. 9B). The design of the drawer 318 may permit operators to quickly and easily open the drawer 318 to access the internal portions of the coupling device 300, and the drawer 318 may permit operators to quickly insert and/or remove a fuse or jumper from the drawer 318. In some embodiments, the drawer 318 may be a swing door that rotates about an axis, but the drawer 318 may simply slide in and out of a recess within the coupling device (i.e. slide in a direction perpendicular to the face of the device) in other embodiments. The drawer 318 may be locked using a wide variety of fasteners, including screws, latches, snap fits, etc. Drawers 318 may also have a tab 854 (see FIG. 8A-8C) in some embodiments so that a user can easily grasp the tab 854 to open and close the drawer 318, but tabs may not be provided in some embodiments.

An indicator 320 may also be provided on the coupling device 300. The indicator 320 may be a light that illuminates, flashes, or blinks when a fuse is blown and the circuit is open. The indicator 320 may be provided as a light emitting diode (LED) light. The indicator may be configured to illuminate in a traditional color, or the indicator may be colored red, blue, etc. However, in some embodiments, the indicator 320 may additionally or alternatively be configured to make an audible noise or to generate vibration. In some embodiments, the indicator may be activated when the fuse is in working order, or the indicator may be activated at all times and may simply change colors or flash/blink when a fuse is blown.

Figure 4A:
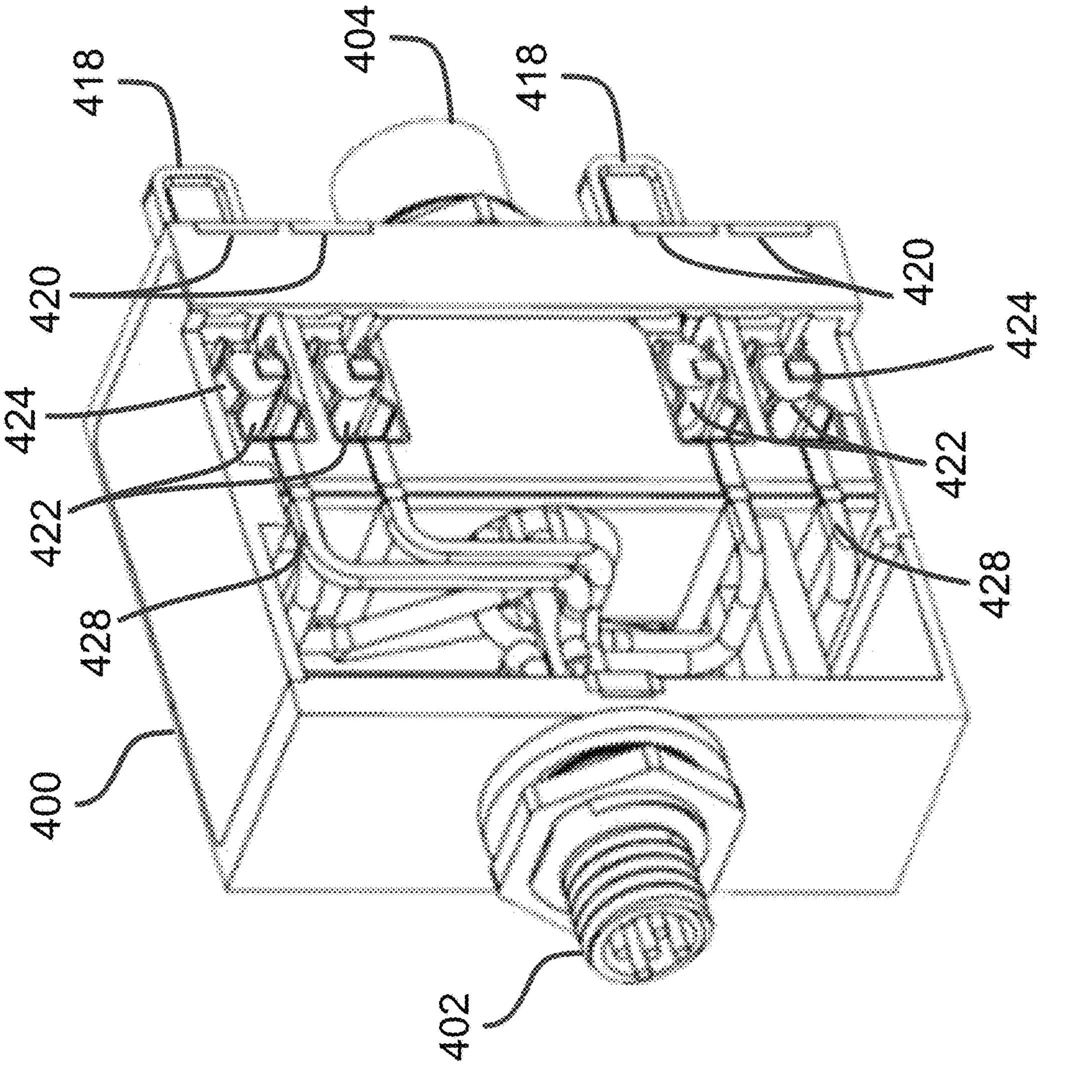
FIG. 4A illustrates a perspective view of an example coupling device with a side surface hidden for the purposes of illustration, in accordance with some embodiments herein.
Figure 4B:
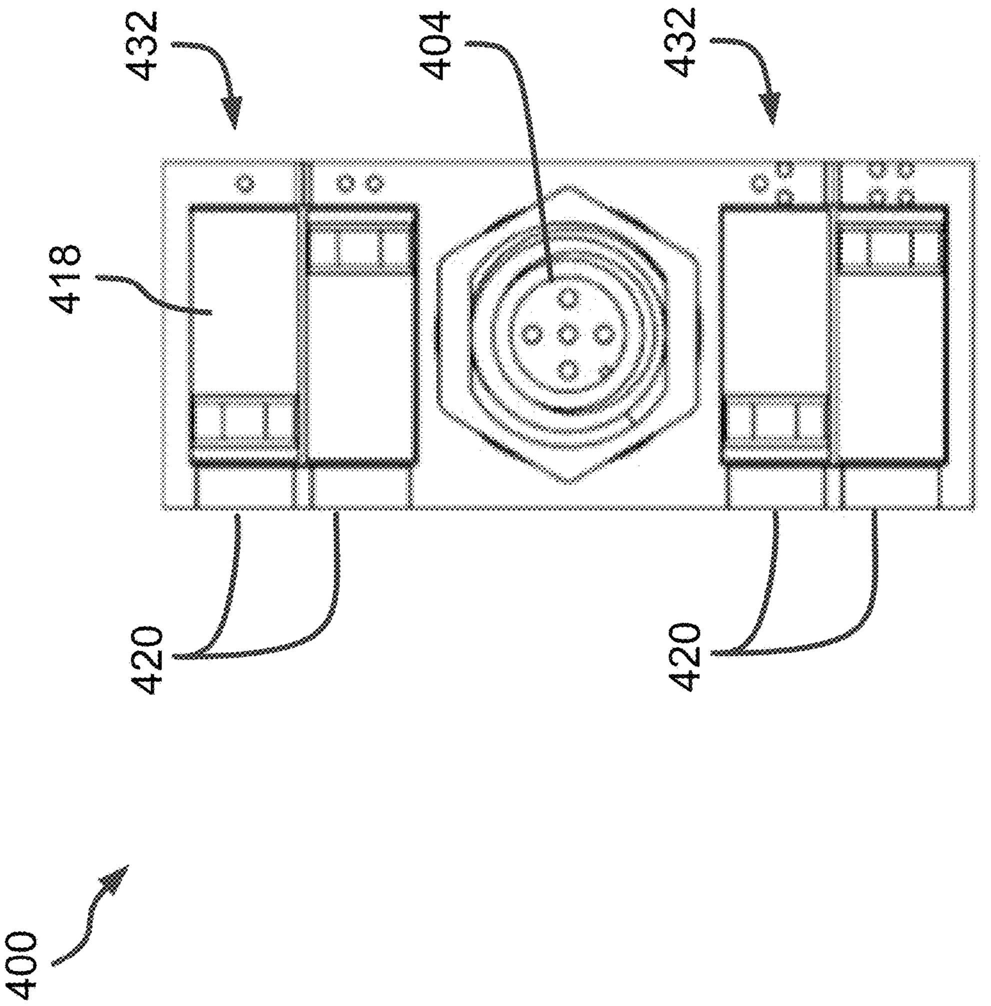
FIG. 4B illustrates a front view of the example coupling device of FIG. 4A.
Figure 4C:
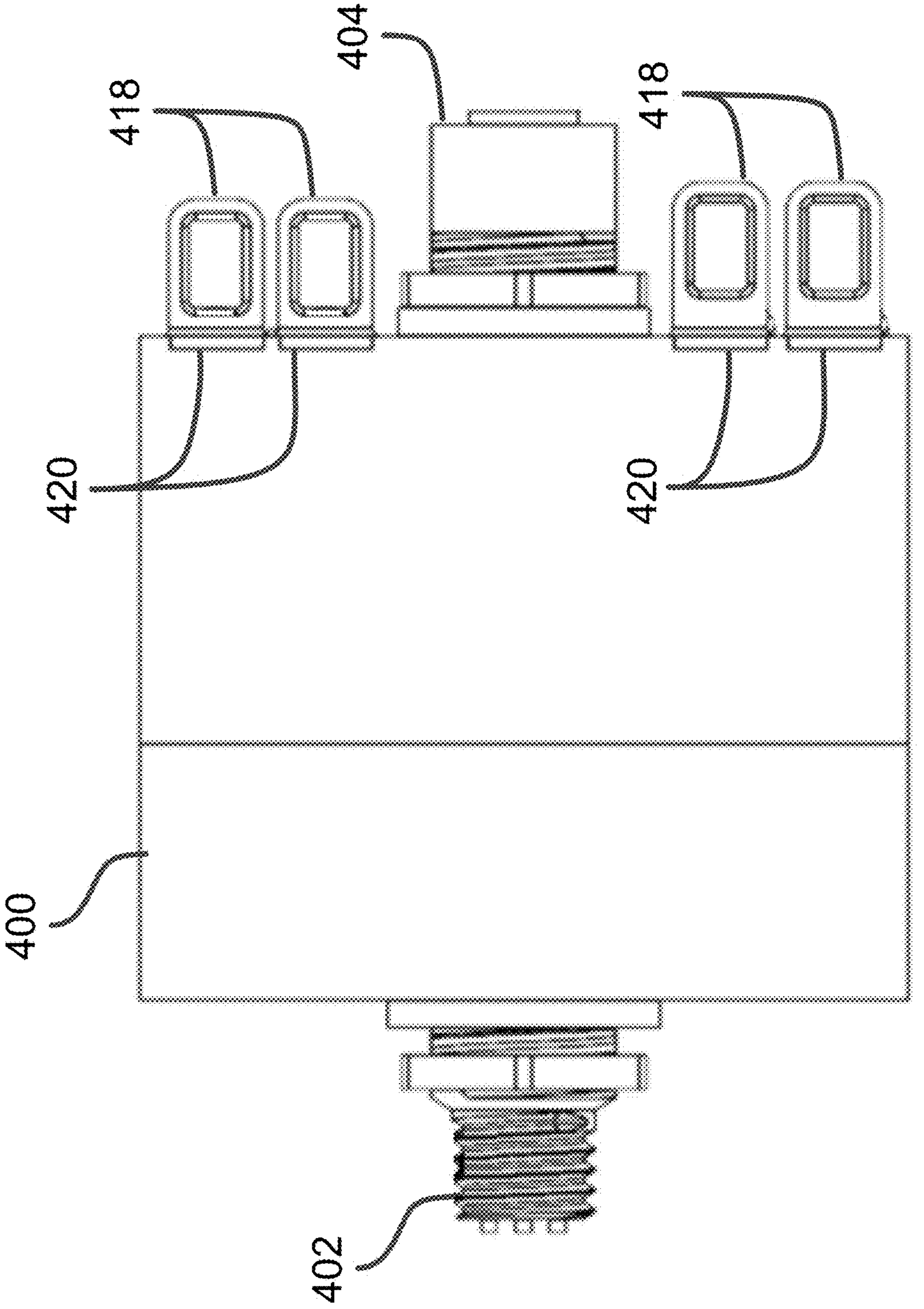
FIG. 4C illustrates a side view of the example coupling device of FIG. 4A.
Figure 4D:
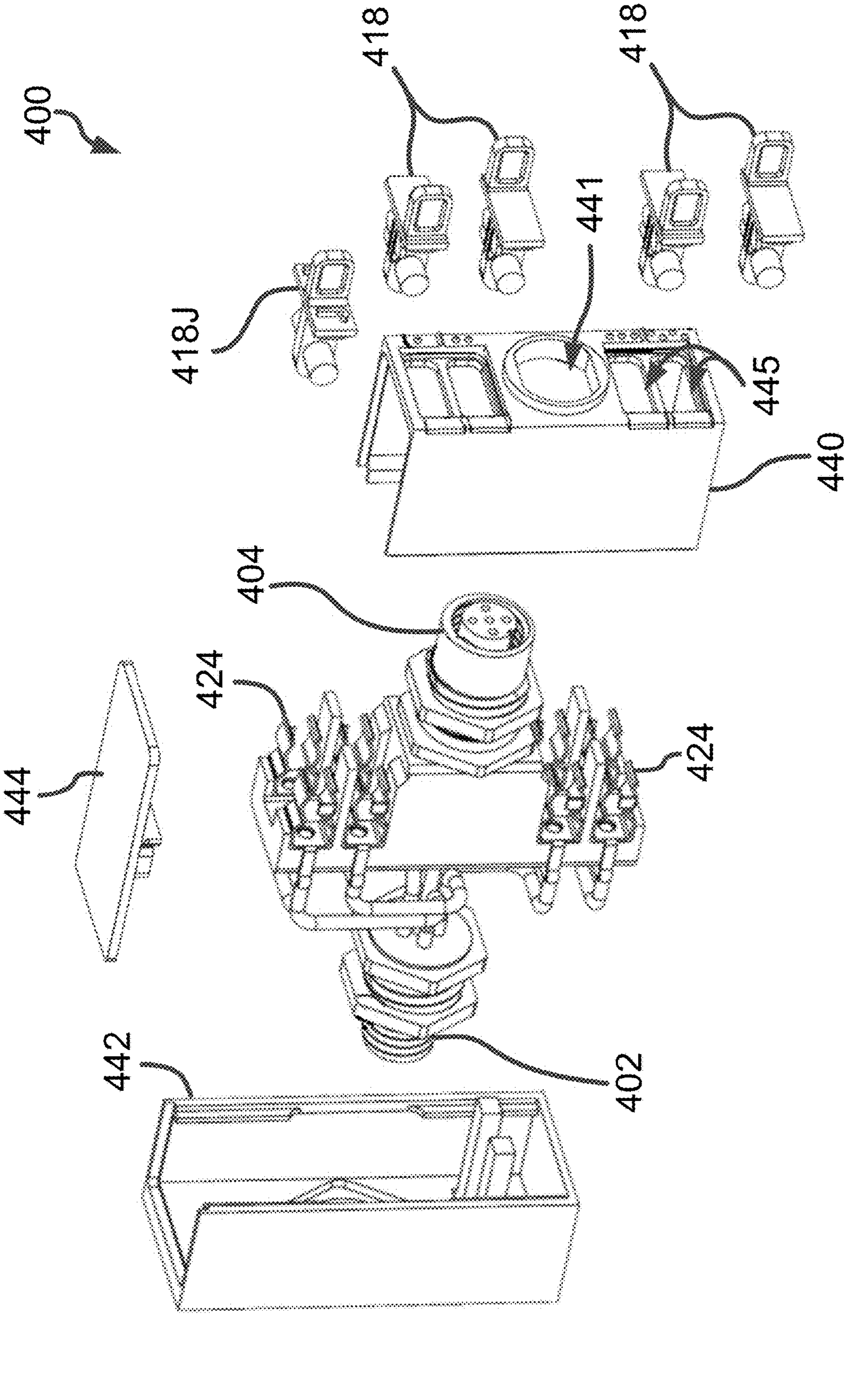
FIG. 4D illustrates an exploded perspective view of the example coupling device of FIG. 4A.

In certain embodiments, an inline coupling device may be utilized. The inline coupling device may be helpful for connecting between two existing cables or between a source and a device. FIGS. 4A-4D illustrate various views of an example coupling device, in accordance with some embodiments herein. FIG. 4A illustrates a perspective view of an example coupling device with a side surface hidden for the purposes of illustration, FIG. 4B illustrates a front view of the example coupling device of FIG. 4A, FIG. 4C illustrates a side view of the example coupling device of FIG. 4A, and FIG. 4D illustrates an exploded view of the coupling device of FIG. 4A.

The coupling device 400 may be similar to the previously described coupling devices in several respects. For example, the coupling device 400 may have a first connector 404 and a second connector 402. The first connector 404 and the second connector 402 may use a standard type of connector in some embodiments. For example, a standard M12 five (5) pin connector may be used in some embodiments. These connectors 402, 404 may include a quick screw-on connector with threads so that a user may quickly secure other components to the connectors 402, 404.

Drawers 418 may be provided that are similar to the drawer 318 of FIG. 3. Looking at FIG. 4A specifically, fuse holders 424 are provided that are configured to at least partially secure a fuse 422. In the illustrated embodiment, the fuse holder 424 is connected to the coupling device 400 so that the fuse holder 424 is fixed relative to the coupling device 400. However, in other embodiments, the fuse holder 424 may be connected to the drawer 418 so that the fuse holder 424 is fixed relative to the drawer 418. Regardless, the fuse holder 424 may be positioned in a manner that will permit a fuse 422 secured therein to electrically connect to internal wires 428 within the coupling device 400, allowing electrical current to flow through the fuse 422 and the internal wires 428. Drawers 418 are discussed further below in reference to FIG. 8A-8C.

Indicators 420 may also be provided that are similar to the indicator 320 of FIG. 3. The indicators 420 may be an LED light, as discussed above. In some embodiments, the indicator 420 may be visible on a side face (see FIGS. 4A and 4C) and on a front face (see FIG. 4B), but the indicator 420 may be visible on only one face in some embodiments. In the illustrated embodiment, one indicator 420 is provided for each drawer 418.

Looking now at FIG. 4B specifically, identifiers 432 are provided. These identifiers 432 are provided as pin numbers in the illustrated embodiment. These identifiers 432 may be used for a variety of purposes. In some cases, these identifiers 432 may distinguish each drawer 418 from the others, providing a specific number for each drawer 418. This identifier 432 may correspond to an identifier 495 (see FIG. 4E) associated with the primary pins 434 (see FIG. 4E).

Additional features of the coupling device 400 may be seen in the exploded view of FIG. 4D. The coupling device 400 may comprise a main shell 440, a rear cover 442, and a top cover 444. The main shell 440 may define one or more recesses 445 at its front face, and the drawers 418 may be secured within the recesses 445. Identifiers 432 (see FIG. 4B) may be provided on the main shell 440, and indicators 420 (see FIGS. 4B, 4C) may also be provided on the main shell 440. The main shell 440 may also define a hole 441 within the front face, and this hole 441 may be sized to permit the first connector 404 to extend outwardly through the hole 441 and past the front face of the main shell 440.

A drawer 418J is also illustrated. This drawer 418J is configured to receive a jumper 975 (see FIG. 9B), and this drawer 418J may be referred to as a "jumper drawer" below. In some embodiments, this jumper drawer 418J may be used as an alternative to the drawers 418, and this jumper drawer 418J may be deployed in some or all of the recesses 445.

Figure 4E:
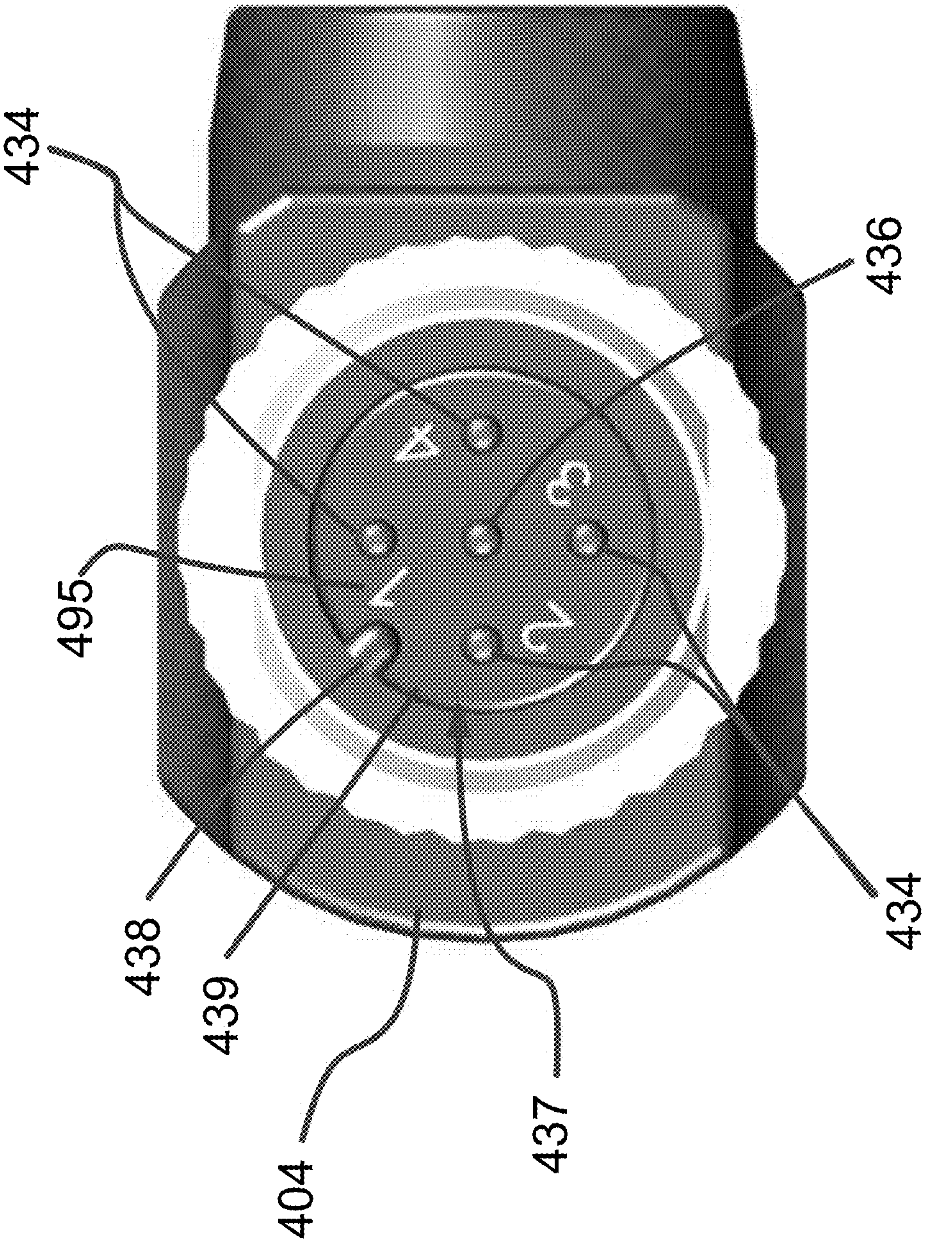
FIG. 4E illustrates an enhanced view of a plug pinout for the first connector of the example coupling device of FIG. 4A.

The coupling device may possess a first connector 404 having a pinout 437 that is configured to provide a standard connection interface. By doing so, the coupling device may be easily connected to a wide variety of components, and the ease of use for users may be increased as a result. FIG. 4E illustrates an enhanced view of a pinout 437 for the first connector 404 of the example coupling device 400 of FIG. 4A. In the illustrated embodiment, the pinout 437 includes four primary pins 434, and one ground pin 436. However, a greater or lesser number of primary pins may be used in other embodiments. A stop 438 may also be provided, and this may assist in restricting the rotational movement of the interface 439, reducing the amount of forces acting on the primary pins 434.

In certain embodiments, a bulkhead coupling device may be utilized. The bulkhead coupling device may be helpful where a user wishes to attach the coupling device to a panel or an enclosure. An M12 bulkhead fitting may be used in some embodiments to attach the coupling device to the side panel of any industrial enclosure, and wires from the coupling device may extend into the enclosure and/or the panel. The wires of the coupling device will be inside the enclosure and will be wired to the associated programmable logic controller (PLC) input/output (I/O) power and signal connections. The four (4) fuses and M12 female connector of the coupling device will remain outside the enclosure. If the fuse(s) need to be replaced, the operator can do so without the need to access the inside of the panel, increasing the safety and ease of use for the bulkhead coupling device.

The inline coupling devices may be configured for use outdoors. These inline coupling devices may include necessary gaskets and insulators to be IP67 rated. With these gaskets and insulators, the inline coupling devices may be dust tight and submersible up to 1 meter of water. The gaskets and insulators may also permit the inline coupling devices to be used in humid or wet conditions.

Figure 5B:
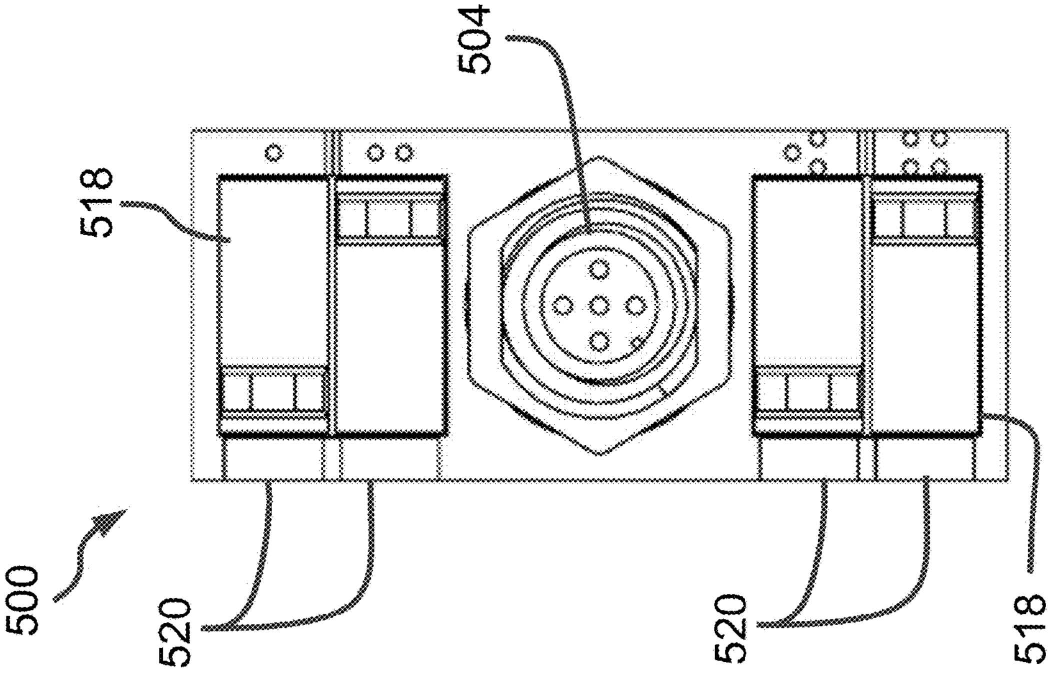
FIG. 5B illustrates a front view of the example coupling device of FIG. 5A.
Figure 5A:
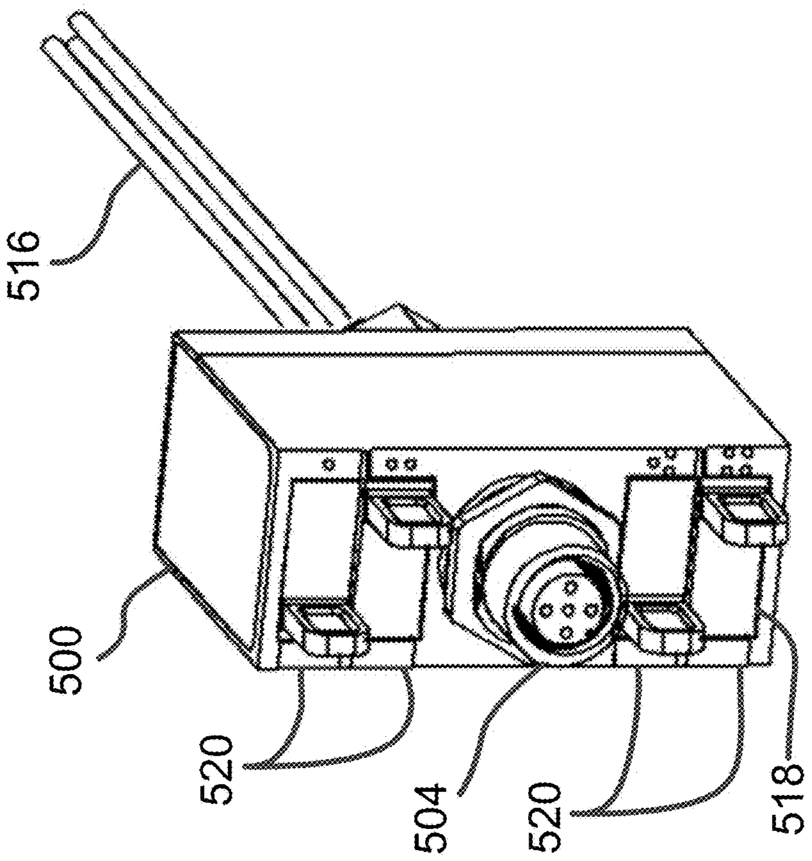
FIG. 5A illustrates a perspective view of another example coupling device, in accordance with some embodiments herein.
Figure 5C:
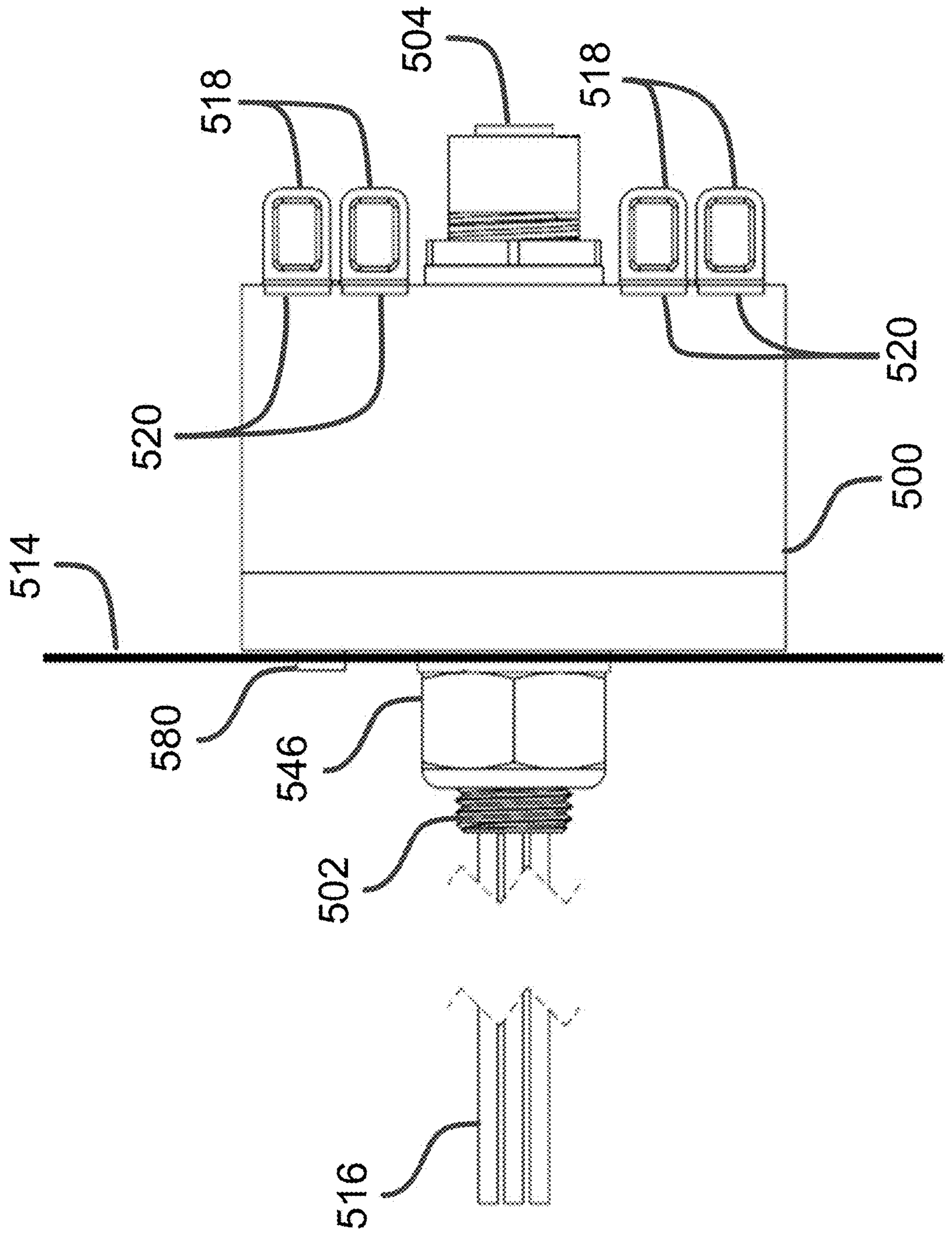
FIG. 5C illustrates a side view of the example coupling device of FIG. 5A.
Figure 5D:
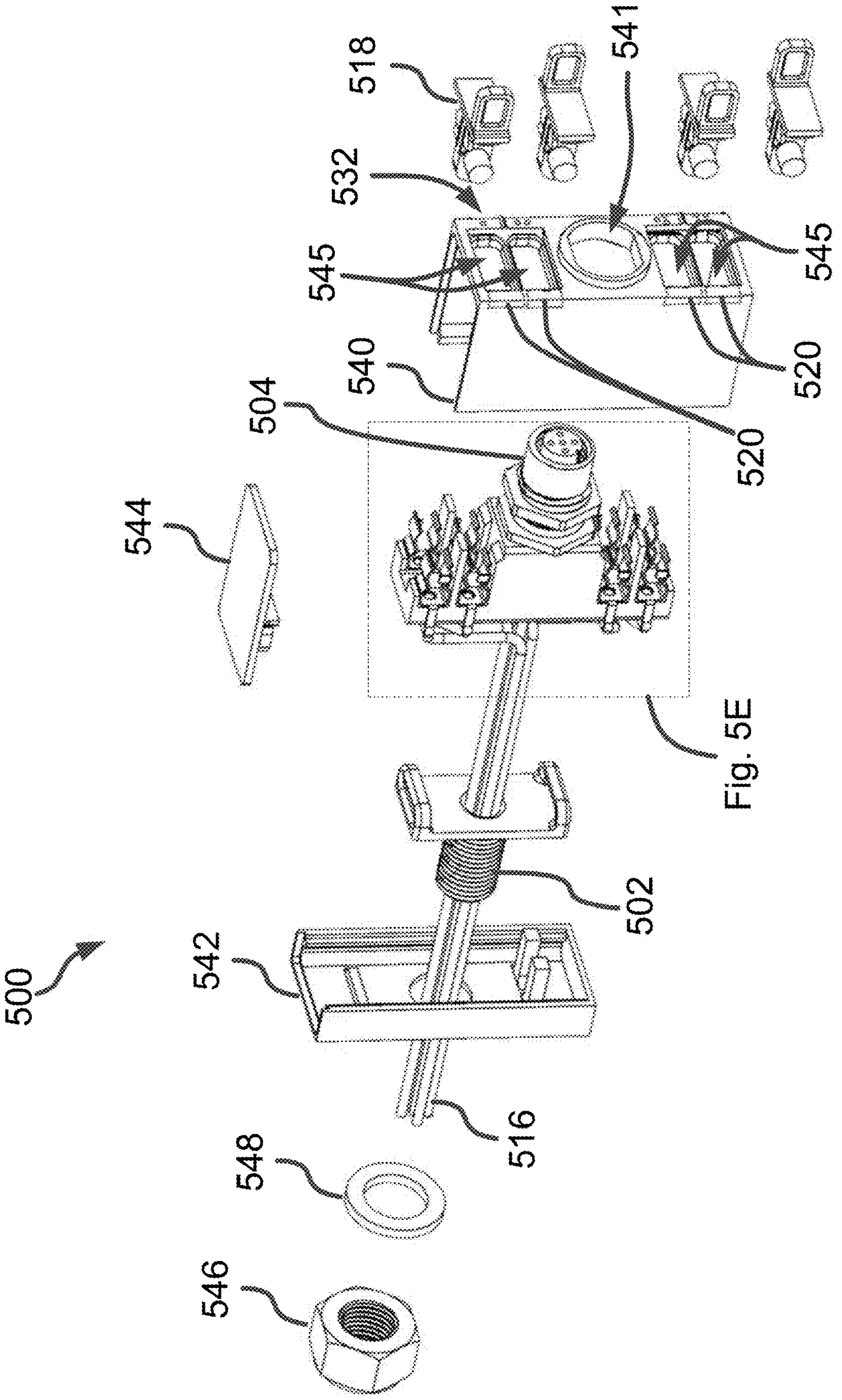
FIG. 5D illustrates an exploded, perspective view of the example coupling device of FIG. 5A.
Figure 5E:
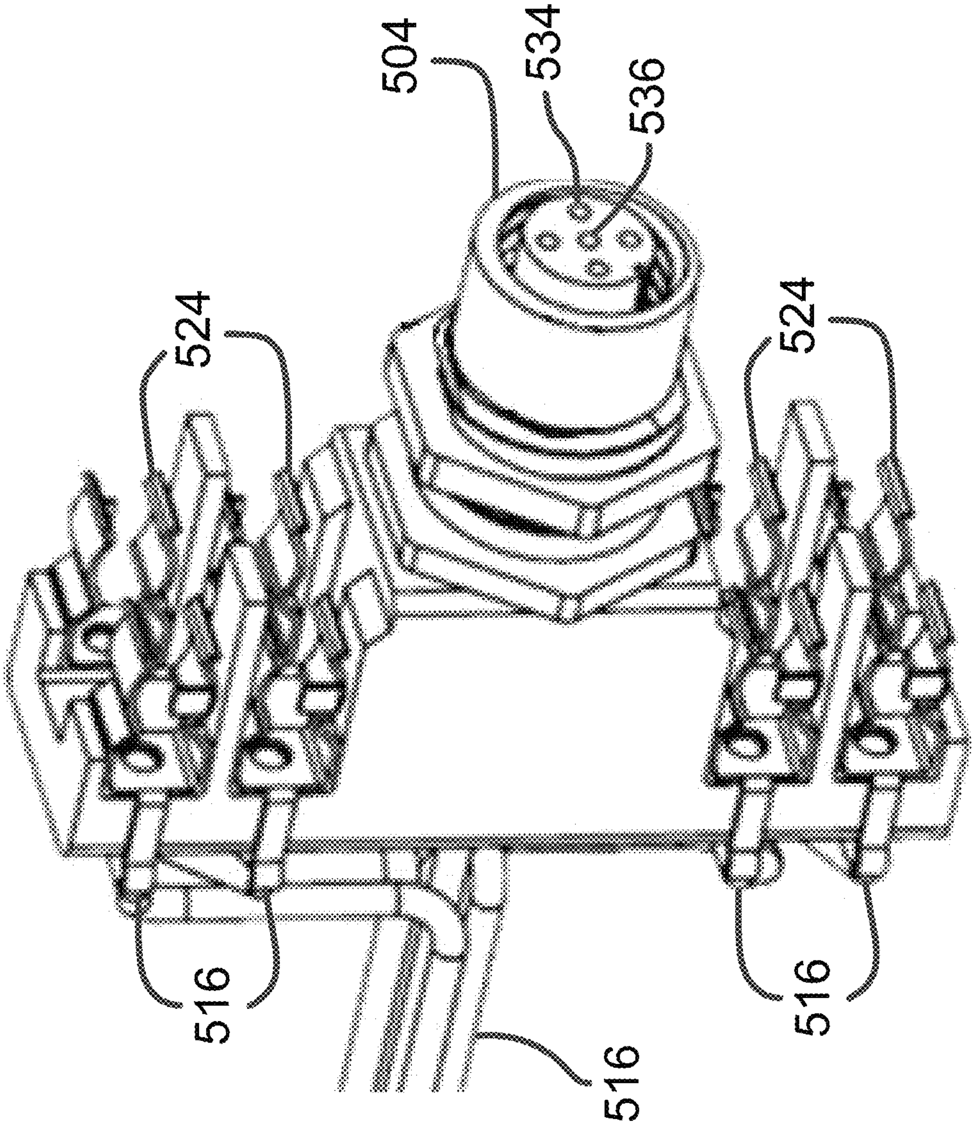
FIG. 5E illustrates an enhanced view of internal portions of the example coupling device of FIG. 5D.

FIGS. 5A-5E illustrate various views of an example bulkhead coupling device, in accordance with some embodiments herein. FIG. 5A illustrates a perspective view of an example bulkhead coupling device. FIG. 5B illustrates a front view of the coupling device of FIG. 5A. FIG. 5C illustrates a side view of the coupling device of FIG. 5A. FIG. 5D illustrates an exploded, perspective view of the coupling device of FIG. 5A. FIG. 5E illustrates an enhanced view of internal portions of the coupling device of FIG. 5A.

As can be seen in FIGS. 5A and 5B, a coupling device 500 is provided with a second connector 502 (see FIG. 5C) and a first connector 504. One or more wires 516 may be connected to the second connector 502 (see FIG. 5C). Additionally, one or more drawers 518 may be provided. In the illustrated embodiment, four drawers 518 are provided, but a greater or lesser number of drawers may be used in other embodiments. An indicator 520 may also be provided that is similar to indicator 420 discussed above.

Looking now at FIG. 5C, the second connector 502 may be readily seen. The second connector 502 extends through a recess defined within a panel 514, and one or more fasteners may assist in retaining the second connector 502 and the coupling device 500 in this position. For example, a nut 546 such as a hex nut is used in the illustrated embodiment, and a washer 548 (see FIG. 5D) may be used in conjunction with the nut 546. However, other fasteners may be used such as adhesives, latches, snap fits, etc. A retaining clip 580 may also be provided to aid in the securement of the coupling device to the panel 514, and this retaining clip 580 may extend through a small hole in the panel 514. This retaining clip 580 may assist in maintaining the coupling device 500 oriented in the desired manner. For example, in the illustrated embodiment, the retaining clip 580 is secured in the hole to keep the coupling device 500 oriented vertically when mounted.

Additional features of the coupling device 500 may be seen in the exploded view of FIG. 5D. The coupling device 500 may comprise a main shell 540, a rear cover 542, and a top cover 544. The main shell 540 may define one or more recesses 545 at its front face, and the drawers 518 may be secured within the recesses 545. Identifiers 532 may be provided on the main shell 540, and indicators 520 may also be provided on the main shell 540. The main shell 540 may also define a hole 541 within the front face, and this hole 541 may be sized to permit the first connector 504 to extend outwardly through the hole 541 and past the front face of the main shell 540.

Looking now at FIG. 5E, an enhanced view is provided of certain features that are housed within the main shell 540 (see FIG. 5D) of the coupling device 500. As illustrated, the first connector 504 can be seen. The first connector 504 may include a certain number of pins. In the illustrated embodiment, the first connector 504 has four primary pins 534 and one ground pin 536. Additional details about these pins can be seen in FIG. 4E and the corresponding discussion above. Each of the primary pins 534 may be configured to serve as part of an electrical circuit with a fuse or a jumper positioned within one of the fuse holders 524. This electrical circuit may be formed when a plug is inserted into the first connector 504 and a fuse or a jumper is inserted into the fuse holder 524. Current may flow through the first connector 504 and through internal wiring to a position proximate to a fuse holder 524. The current may then flow from the internal wiring through a fuse or a jumper within the fuse holder 524, and then current may flow through the fuse or jumper to a respective wire within the wires 516.

While certain pins 534, 536 are described above, pin receivers may be provided instead where the first connector is a female connector, and pins 534, 536 may be provided where the first connector is a male connector.

The bulkhead coupling devices may be configured for use outdoors. These bulkhead coupling devices may include necessary gaskets and insulators to be IP67 rated. With these gaskets and insulators, the bulkhead coupling devices may be dust tight and submersible up to 1 meter of water. The gaskets and insulators may also permit the bulkhead coupling devices to be used in humid or wet conditions.

Figure 6A:
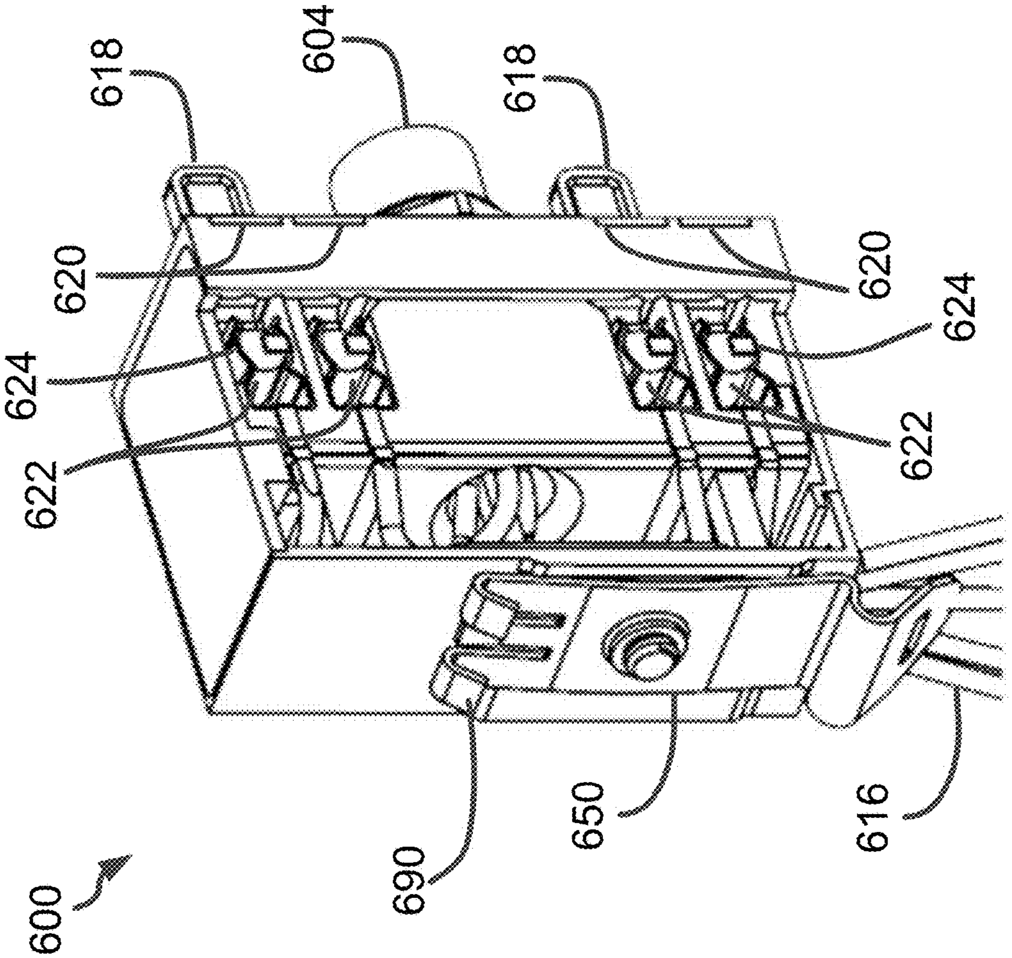
FIG. 6A illustrates a perspective view of another example coupling device with a side surface hidden for the purposes of illustration, in accordance with some embodiments herein.
Figure 6B:
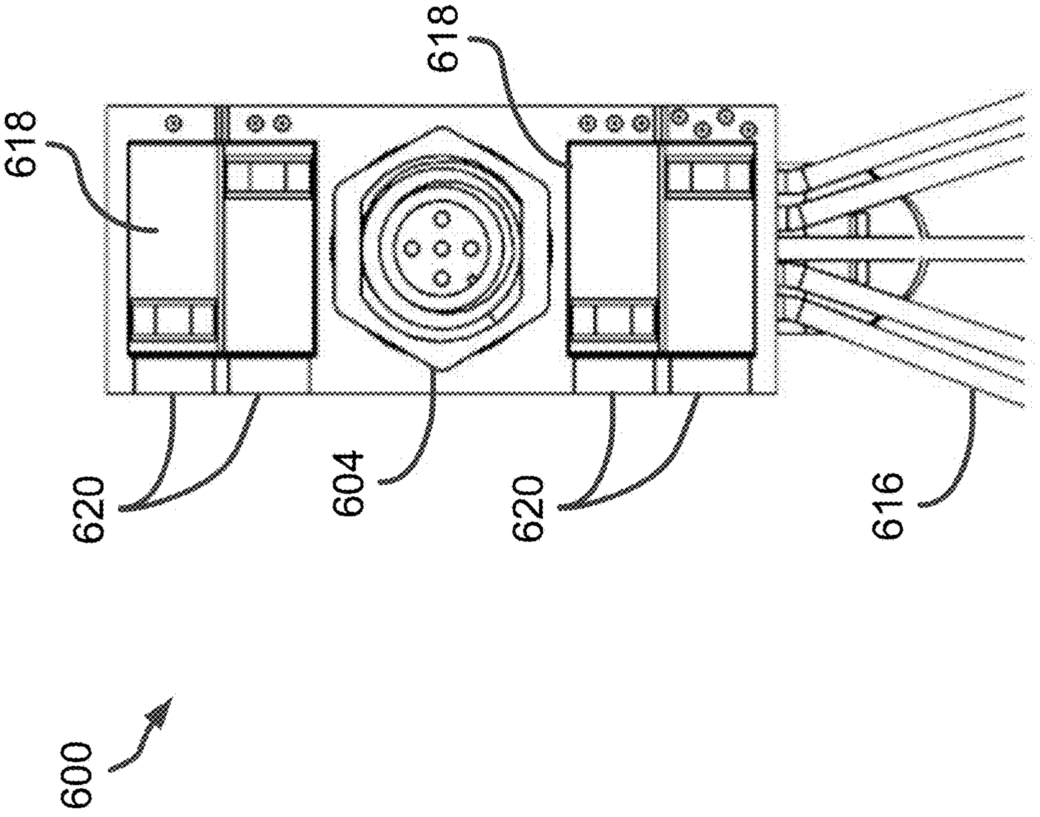
FIG. 6B illustrates a front view of the example coupling device of FIG. 6A.
Figure 6C:
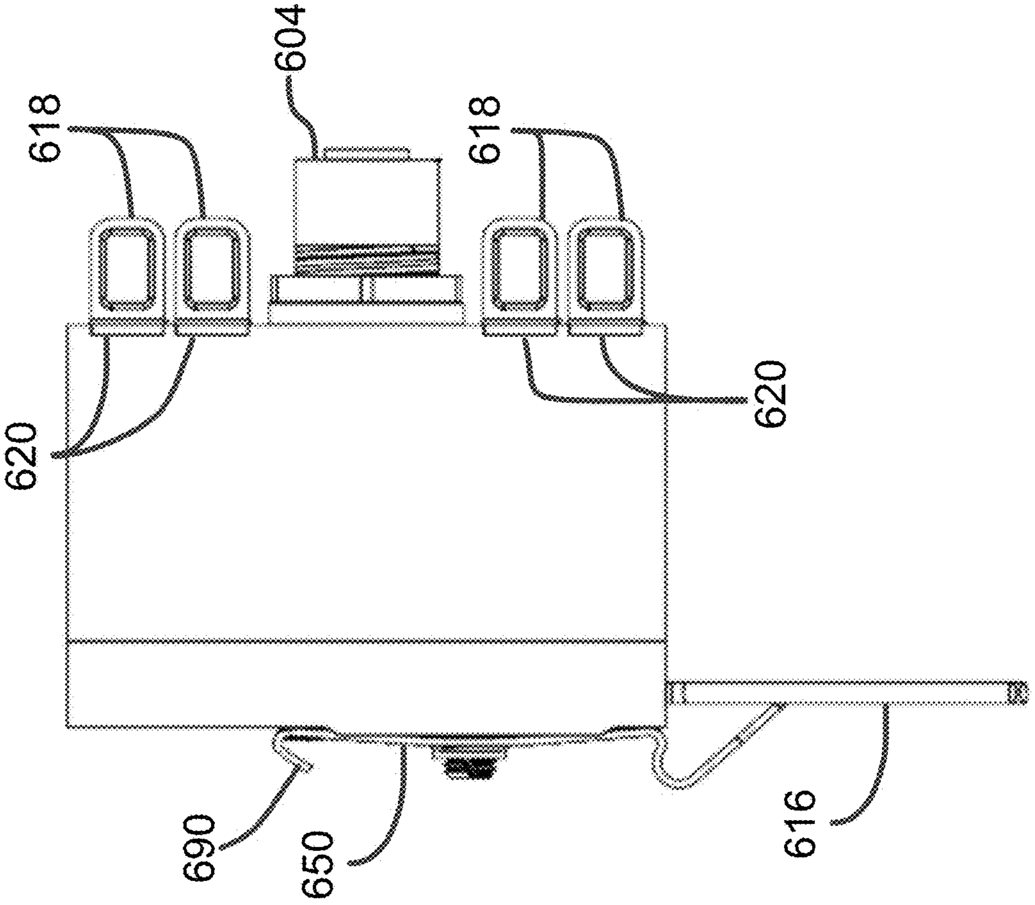
FIG. 6C illustrates a side view of the example coupling device of FIG. 6A.
Figure 6D:
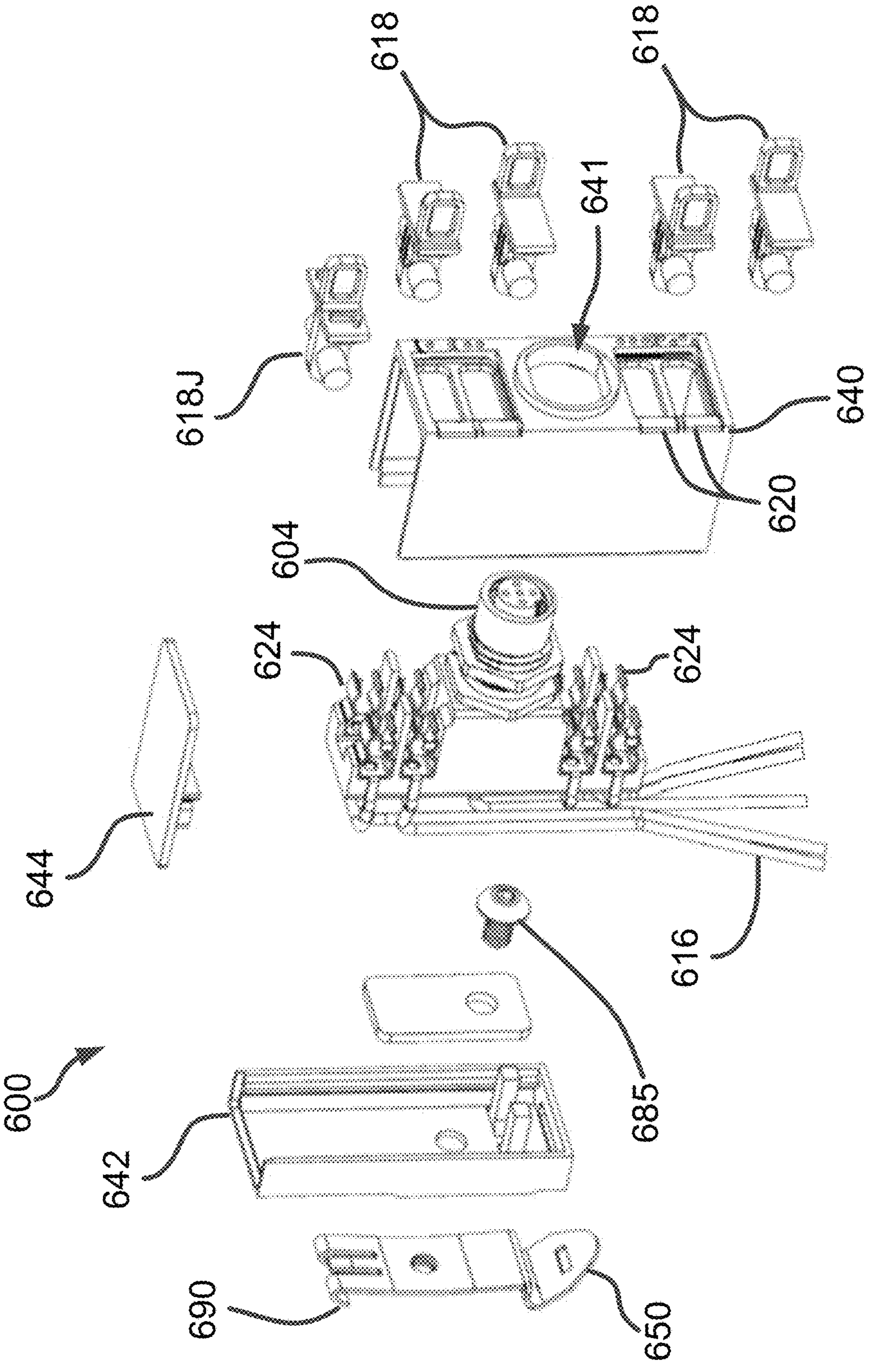
FIG. 6D illustrates an exploded perspective view of the example coupling device of FIG. 6A.

In some embodiments, a din-rail mount version of the coupling device may be utilized. With this version, the coupling device may be assembled with a standard din rail mount within an industrial enclosure. FIGS. 6A-6D illustrate various views of another example coupling device that is configured to operate with a din-rail mount, in accordance with some embodiments herein. FIG. 6A illustrates a perspective view of the din-rail mount version of the coupling device with a side surface hidden for the purposes of illustration. FIG. 6B illustrates a front view of the coupling device of FIG. 6A. FIG. 6C illustrates a side view of the coupling device of FIG. 6A. FIG. 6D illustrates an exploded perspective view of the coupling device of FIG. 6A.

Looking first at FIGS. 6A-6C, the internal portions of the coupling device 600 may be readily seen. As noted above, wiring may connect primary pins 534 (see FIG. 5E) of the first connector 604 to a fuse 622 within the fuse holders 624. A jumper 975 (see FIG. 9B) may be used as an alternative to a fuse 622. The fuse 622 or a jumper 975 (see FIG. 9B) may be in electrical communication with one of the wires 616, and the wires 616 may be wired to an associated programmable logic controller (PLC) input/output (I/O) power and/or signal connection. Similar to the embodiments discussed above, the coupling device 600 may also comprise one or more indicators 620 and one or more drawers 618.

A rail mount 650 may be provided, and this rail mount 650 may be a DIN rail mount. This rail mount 650 may be configured to provide mounting that may be easily secured to a din rail in a panel using an integrated clip 690. This configuration may be used to increase the ease of use for users.

FIG. 6D illustrates an exploded view where additional features may be seen. Many of these features are similar to those illustrated in FIG. 5D. Like the coupling device 500, the coupling device 600 includes a main shell 640, a rear cover 642, and a top cover 644, and a recess 641 is defined within the front face of the main shell 640. Unlike the coupling device 500, the coupling device 600 may be secured to the rail mount 650 through the use of one or more fasteners 685. In the illustrated embodiment, a screw is utilized as a fastener, with the screw extending through a recess within the rear cover 642 so that it can be secured in the rail mount 650. Also, a jumper drawer 618J is illustrated, and this jumper drawer 618J may be a drawer 618 that is configured to receive a jumper 975 (see FIG. 9B).

The main shell 640, the rear cover 642, and the top cover 644 may comprise or be made solely of ABS plastic, non-conductive metal, or an equivalent material in some embodiments.

Figure 7A:
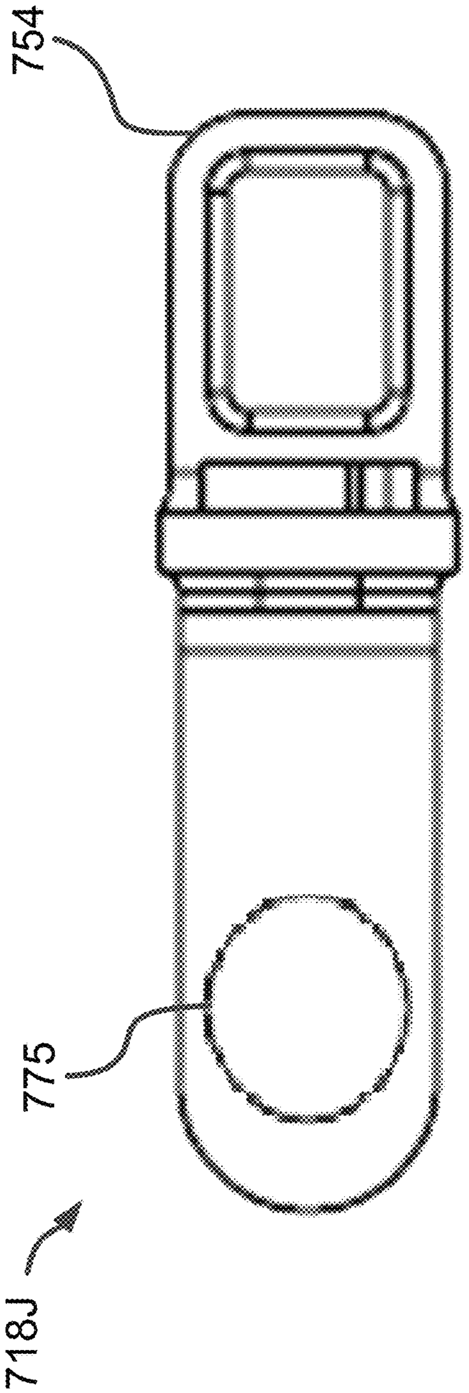
FIG. 7A illustrates a side view of an example drawer for a jumper, in accordance with some embodiments herein.
Figure 7C:
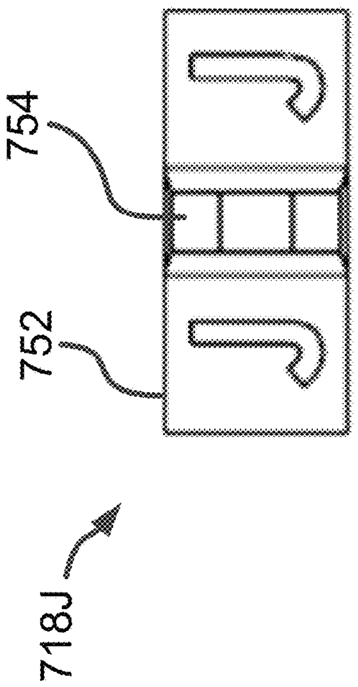
FIG. 7C is a front view of the drawer of FIG. 7A.
Figure 7B:
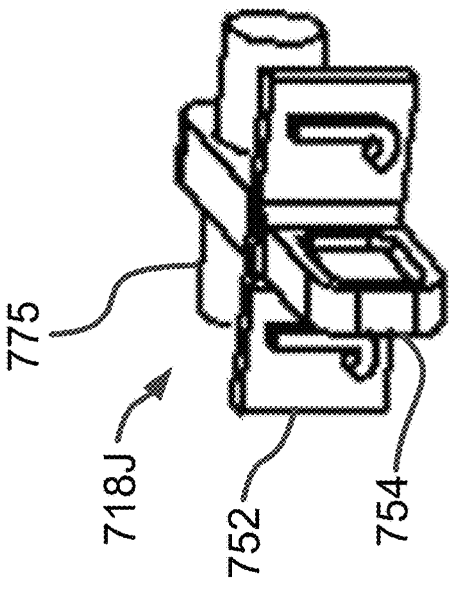
FIG. 7B is a perspective view of the drawer of FIG. 7A.

As noted above, jumper drawers with jumpers may be used. These jumper drawers may be utilized where a user does not wish to implement any short circuit protection in a given location. These jumper drawers are advantageous as the allow the user to tailor the system to their specific needs. The jumper drawers may allow the user to mix and match specialized jumper drawers 718J and other drawers 818 (see FIGS. 8A-8C) as desired. FIG. 7A-7C illustrate a jumper drawer that may be used as an alternative to a drawers, in accordance with some embodiments herein. FIG. 7A is a side view illustrating an example jumper drawer 718J, FIG. 7B is a perspective view of the jumper drawer 718J of FIG. 7A, and FIG. 7C is a front view of the jumper drawer 718J of FIG. 7A. The jumper drawer 718J is similar to the drawer 818 (see FIGS. 8A-8C) in several respects. However, the jumper drawer 718J may be possess markings on the front panel to distinguish the jumper drawer 718J from other drawers 818. In the illustrated embodiments, the letter J is engraved in the door 752 of the jumper drawer 718J to distinguish the jumper drawer 718J. Additionally, the tab 754 may be secured in a central position of the door 752 rather than on the sides of the door 752 like the tabs 854 of the drawers 818 described below. However, in some embodiments, the tabs 754 and tabs 854 may be installed at the same position, or the tabs 754 may be installed towards the side of the door 752 of the jumper drawer 718J.

A jumper 775 is secured within the jumper drawer 718J. This jumper 775 may be permanently secured within the jumper drawer 718J in some embodiments. However, the jumper drawer 718J may also be configured to easily install and/or remove the jumper 775.

Figure 8A:
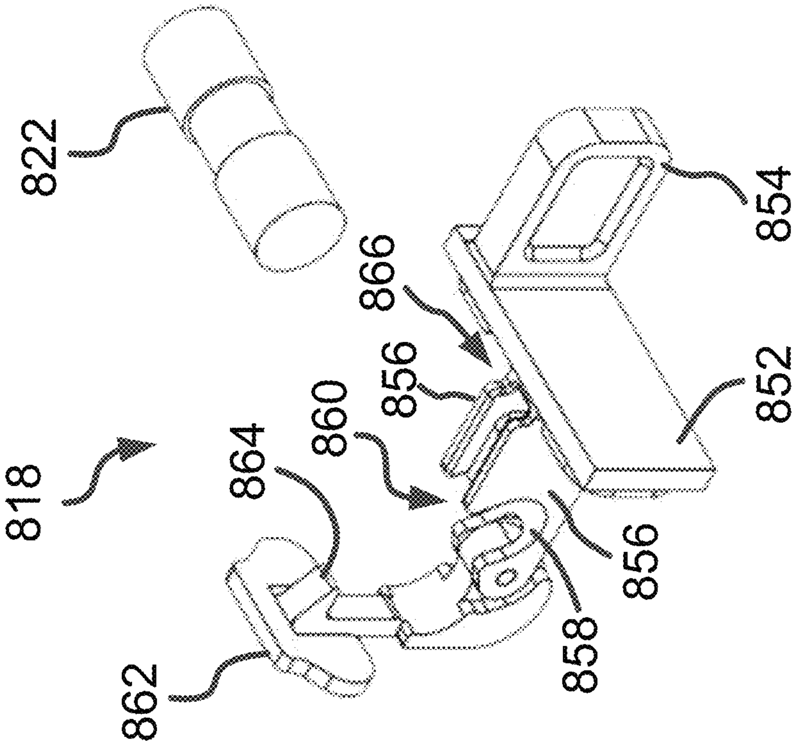
FIG. 8A illustrates a perspective view of a fuse and a drawer that is in an opened state, in accordance with some embodiments herein.
Figure 8B:
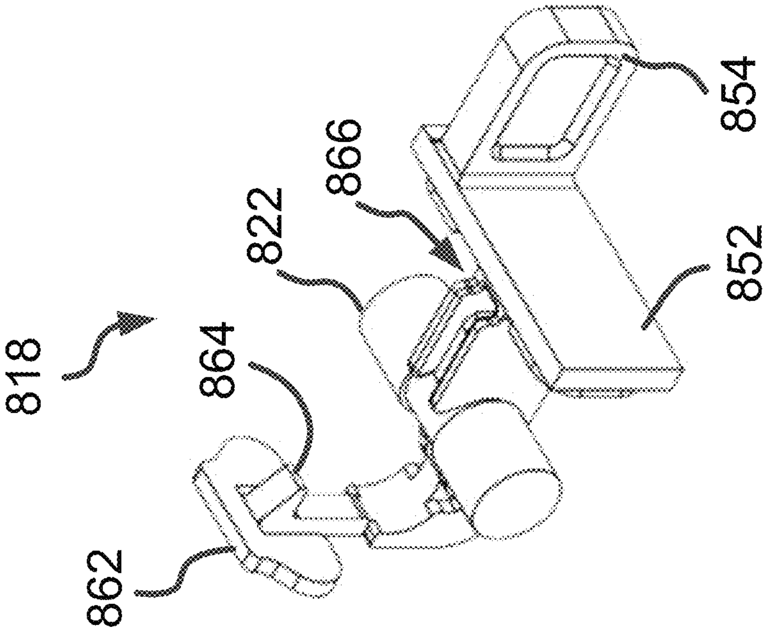
FIG. 8B illustrates a perspective view of the fuse and the drawer of FIG. 8A where the fuse is placed within the drawer.
Figure 8C:
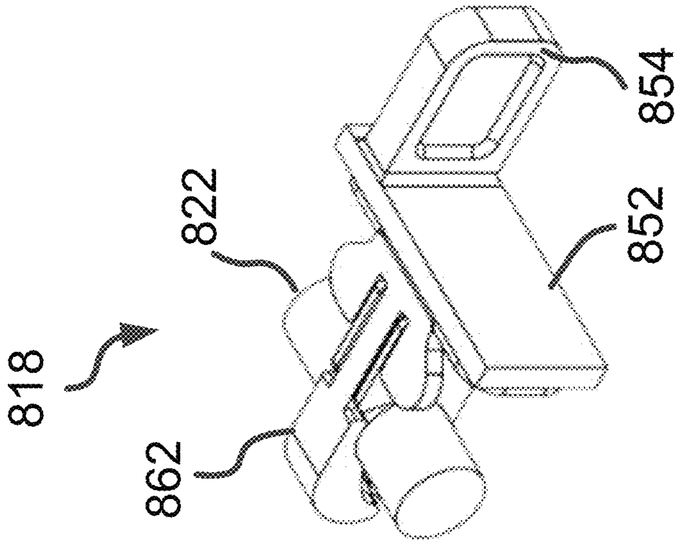
FIG. 8C illustrates a perspective view of the fuse and the drawer of FIG. 8A where the fuse is secured within the drawer and where the drawer is in a closed state.

Drawers may also be provided to enable a user to easily install and/or remove a fuse 822. FIGS. 8A-8C illustrate a drawer 818 in various states. FIG. 8A illustrates a perspective view of a fuse 822 and a drawer 818 that is in an opened state, in accordance with some embodiments herein. FIG. 8B illustrates a perspective view of the fuse 822 and the drawer 818 of FIG. 8A where the fuse 822 is placed within the drawer 818. FIG. 8C illustrates a perspective view of the fuse 822 and the drawer 818 of FIG. 8A where the fuse 822 is secured within the drawer 818 and where the drawer 818 is in a closed state.

The drawer 818 may be configured to secure a fuse 822 therein. The drawer includes a door 852 having a tab 854. In some embodiments, the tab 854 may be provided towards one of the sides of the front surface of the door 852. The tab 854 may be provided on the left side for some of the drawers 818 and on the right side for others. In this way, the position of the tabs 854 may alternate as illustrated in FIG. 6B. The position of the tab 854 may also be utilized to distinguish the drawer 818 from a jumper drawer 718J (see FIG. 7B), which may have its own tab 754 (see FIG. 7B) in a central position on the front surface of its door 752 (see FIG. 7B).

In the illustrated embodiment, the drawer 818 may include a body 856, and the body 856 may include an alignment slot 858 defining a recess 860. The drawer 818 may also include a locking member 862 with a locking clip 864. This locking member 862 may be configured to rotate about a rotational pin. The locking clip 864 may be configured to engage a locking clip receiver 866 so that the drawer 818 may be placed in a closed state. However, in some embodiments, the locking clip 864 may be provided on the body 856 and the locking clip receiver 866 may be provided on the locking member 862. Additionally, the locking member 862 may be configured to slide in some embodiments. Alternatively, the locking member 862 may be permitted to be removed so that it can move freely, a fuse 822 can be added or removed as desired, and then the locking member 862 may be secured back into place to secure the fuse 822.

In FIG. 8A, the drawer 818 is illustrated in an opened state with the fuse 822 positioned away from the drawer 818. As illustrated in FIG. 8B, the fuse 822 may be placed in the recess 860 defined by the alignment slot 858. As illustrated in FIG. 8C, the fuse 822 may be secured in place by locking the locking member 862 through an engagement of the locking clip 864 and the locking clip receiver 866. If desired, the drawer 818 may then be inserted into the coupling device recess 445 (see, e.g., FIG. 4D). In an embodiment, the fuse 822 clips into the fuse holder 424 (see, e.g., FIG. 4D) as the drawer 818 is pushed into the recess 445 (see, e.g., FIG. 4D), securing the fuse 822 in place and preventing further insertion. Likewise, the door 852 of the drawer 818 may contact the front face of the main shell 440 (see, e.g., FIG. 4D) of the coupling device 400 and prevent further insertion. In other embodiments, the drawer 818 could ride along a rail or track internal to the coupling device 400.

Where one desires to remove the fuse 822 from the drawer 818, the drawer 818 may be removed from the coupling device (see, e.g., 400, FIG. 4B) by sliding it outwardly, perpendicular to the front face of the main shell 440, which will cause the drawer 818 to appear as illustrated in FIG. 8C. The locking member 862 may be opened by disengaging the locking clip 864 and the locking clip receiver 866 to cause the drawer 818 to appear as illustrated in FIG. 8B. The fuse 822 may then be removed from the drawer 818. While complete removal of the drawer 818 is contemplated herein, removal of the fuse 822 while the drawer 818 is in a partially opened configuration may be possible.

In some embodiments, the drawer 818 and the jumper drawer 718J may include a seal that will protect the fuse and other circuitry from humidity and other environmental factors. This seal may be provided as an O-ring in some embodiments. This sealing may also be provided at other locations in the coupling device.

Figure 9A:
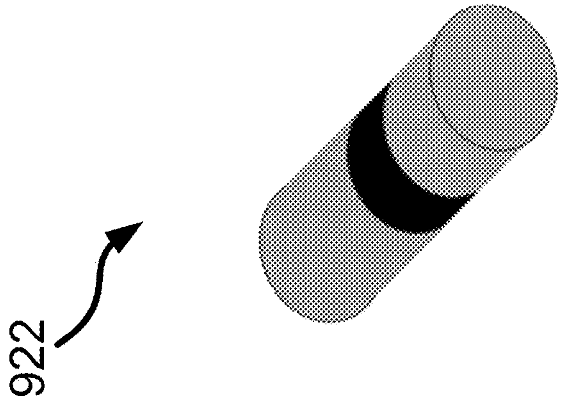
FIG. 9A illustrates a perspective view of an example fuse, in accordance with some embodiments herein.
Figure 9B:
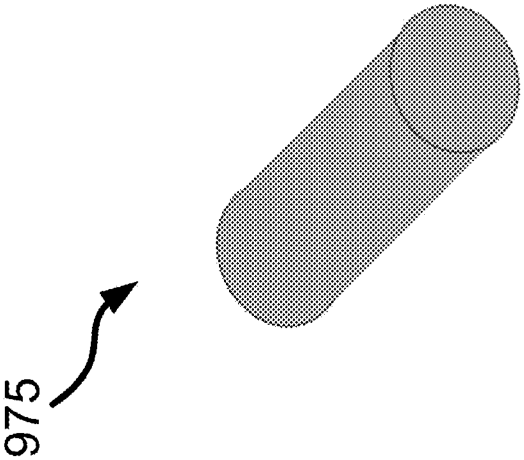
FIG. 9B is a perspective view of an example jumper, in accordance with some embodiments herein.

As discussed above, a fuse or a jumper may be used in some embodiments, permitting the user to tailor the coupling device to his or her needs. FIG. 9A illustrates a perspective view of an example fuse 922, in accordance with some embodiments herein. FIG. 9B illustrates a perspective view of an example jumper 975, in accordance with some embodiments herein. The fuse 922 may be a 5 mm×15 mm glass fuse. The jumper 975 may be a conductive bar made of any conductive material such as metal. The jumper 975 may be a 5 mm×15 mm metal jumper in some embodiments. However, other sized fuses 922 and jumpers 975 may be used in some embodiments. The jumper 975 may simply include a conductive bar, so it will not provide any short circuit protection and it will instead close the circuit so that electrical current may eventually flow through the jumper 975 and the connected circuitry.

Figure 10:
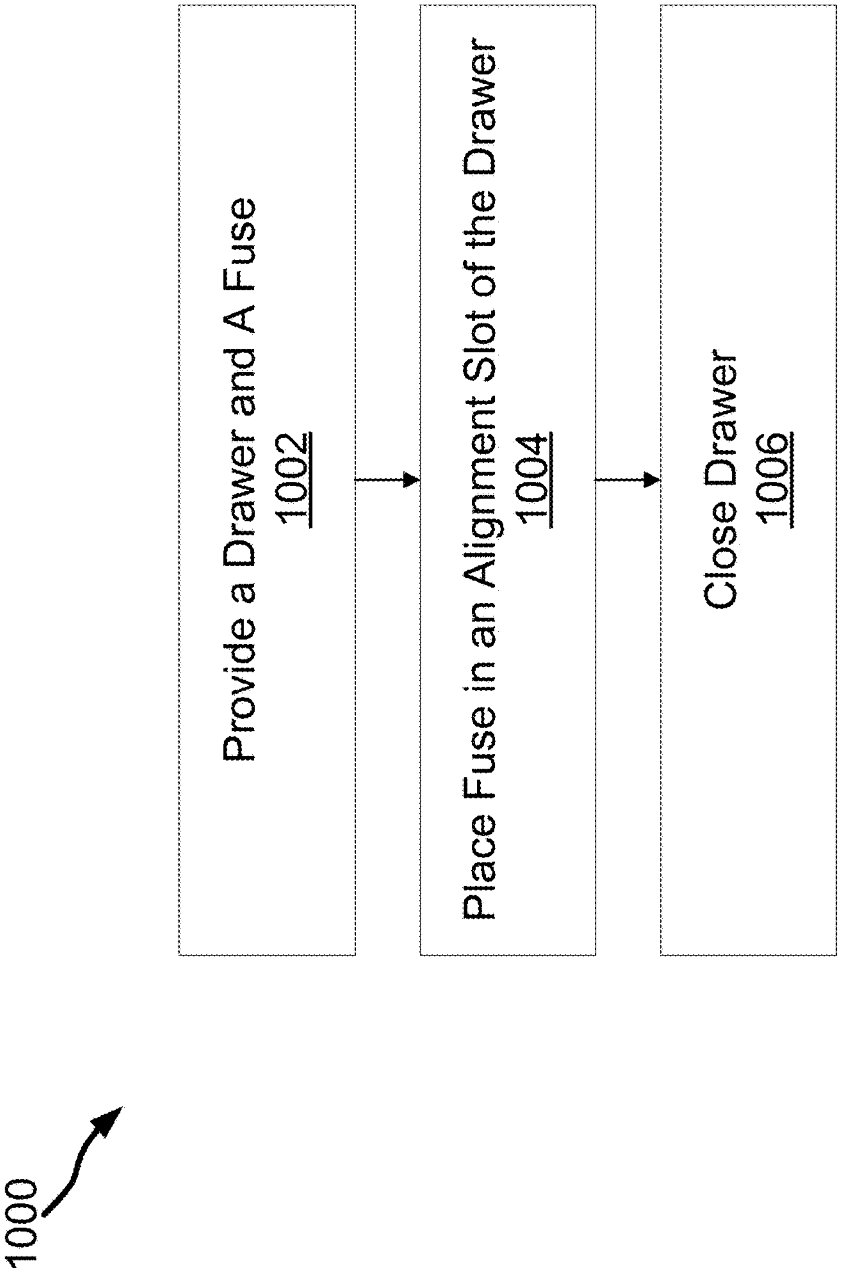
FIG. 10 illustrates a flow chart illustrating steps of an example method for securing a fuse within a drawer, in accordance with some embodiments herein.

Methods are also contemplated for adding and removing a fuse or a jumper into a drawer or jumper drawer. FIG. 10 is a flow chart illustrating an example method 1000 for securing a fuse within a drawer, in accordance with some embodiments herein. At operation 1002, a drawer and a fuse are provided, with the drawer being in an opened state. At operation 1004, the fuse is placed within an alignment slot in the drawer. At operation 1006, the drawer may be closed by securing the fuse in the drawer. This may be done using the locking clip and locking clip receiver described above, but other approaches may be used as well. While FIG. 10 illustrates an example method where a fuse and a drawer are used, a jumper and a jumper drawer may also be used in some embodiments, and the method of installation above may be performed similarly where a jumper and a jumper drawer are utilized.

Figure 11:
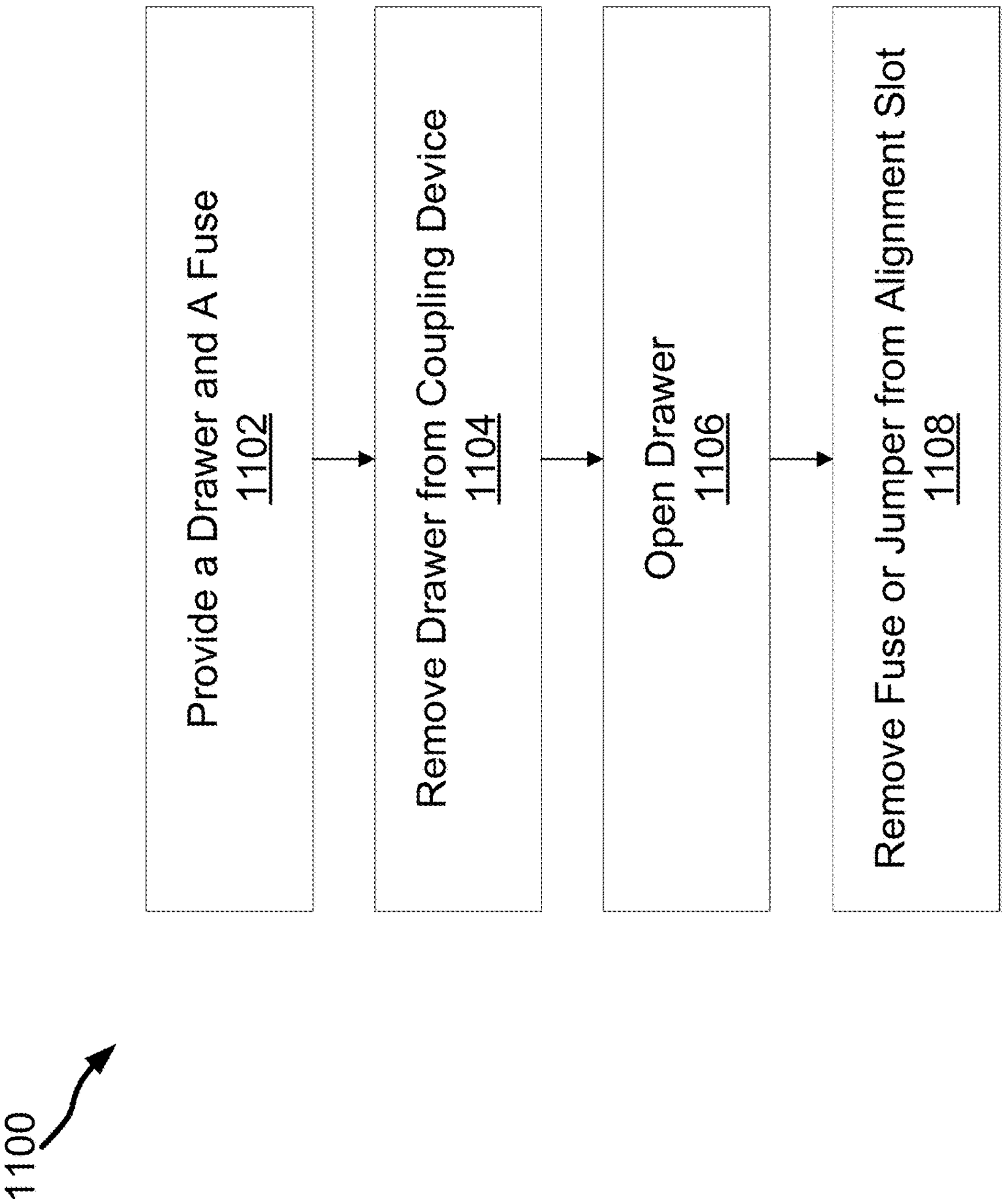
FIG. 11 illustrates a flow chart illustrating steps of an example method for removing a fuse from a drawer, in accordance with some embodiments herein.

FIG. 11 is a flow chart illustrating an example method 1100 for removing a fuse within a coupling device, in accordance with some embodiments herein. At operation 1102, a drawer and a fuse are provided, with the fuse secured within the drawer and with the drawer in a closed state. At operation 1104, the drawer may be removed from the coupling device, and this may permit the fuse itself to be accessed. At operation 1106, the drawer may be opened by disengaging a locking clip and a locking clip receiver (in embodiments where those components are used). At operation 1108, the fuse may be removed from the alignment slot of the drawer.

Figure 12:
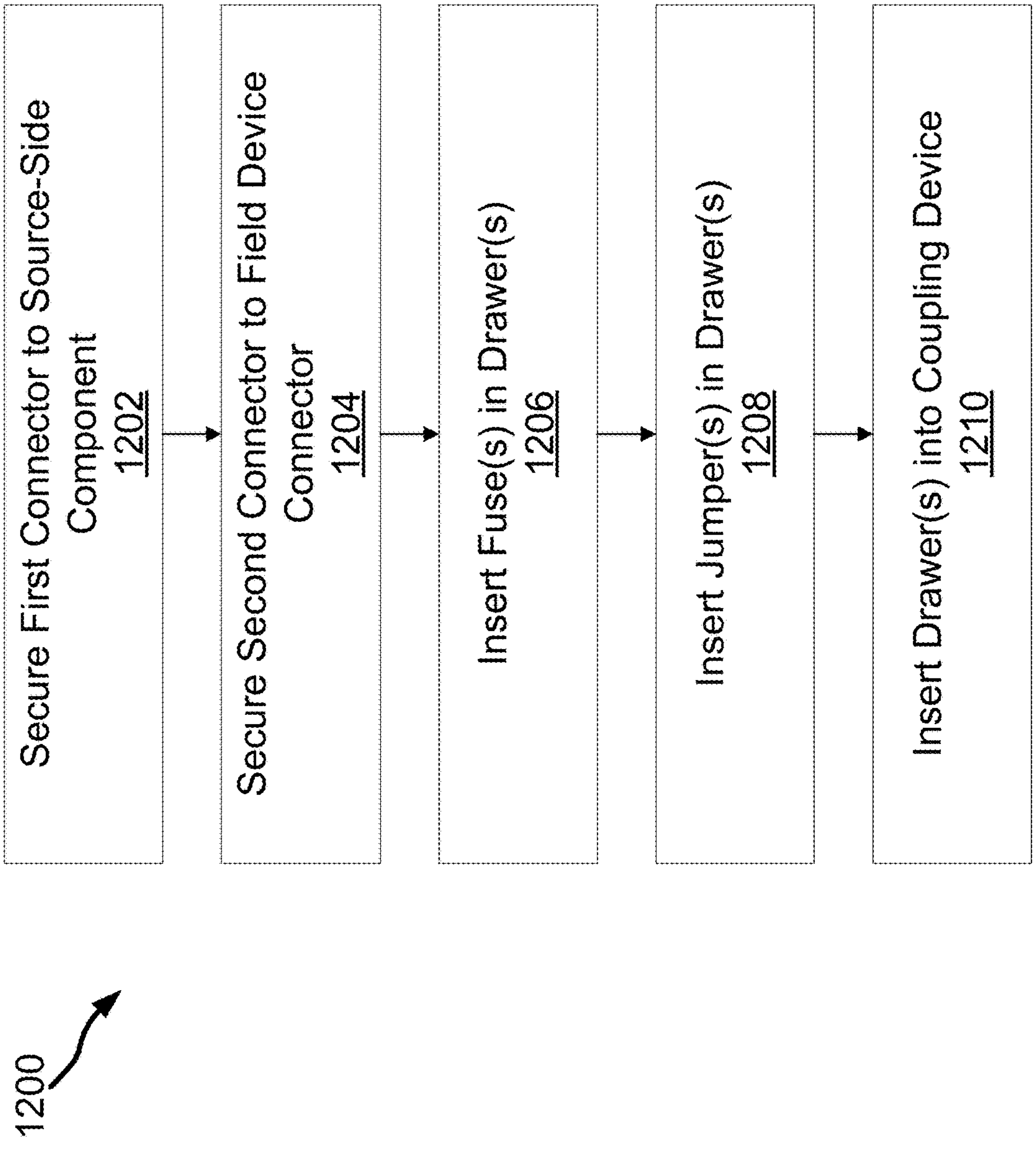
FIG. 12 illustrates a flow chart illustrating steps of an example method for installing a coupling device, in accordance with some embodiments herein.

Methods are also contemplated for connecting a coupling device into a new or existing circuit. FIG. 12 is a flow chart illustrating an example method 1200 for connecting a coupling device into a new or existing circuit. At operation 1202, the first connector of the coupling device is fastened to a source-side component. This source side component may be, for example, a cable or bulkhead connector. At operation 1204, the second connector of the coupling device is fastened to a plug of a field device connector. In some embodiments, operation 1204 will not be performed—for example, this may not be performed where a din-rail mount version of the coupling device is used (see FIGS. 6A-6D). At operation 1206, fuses may be inserted in the associated drawer to provide short circuit protection as desired. At operation 1208, a user may insert a jumper into a jumper drawer. This may be done where short circuit protection is not desired, and the user may utilize a drawer where short circuit protection is desired. At operation 1210, drawers and/or jumper drawers may be inserted into the coupling device.

It should be understood that the operations of methods 1000, 1100, and 1200 described above may be performed in any order unless specified otherwise. For example, operation 1208 may be performed before operation 1206. Additionally, operations may be added, and certain operations may be omitted without departing from the scope of the invention.

For example, in some embodiments, the method 1200 may be modified by omitting operation 1208 where a user does not wish to utilize a jumper.

The present invention has been described and illustrated with respect to a number of exemplary embodiments thereof. It should be understood by those skilled in the art from the foregoing that various other changes, omissions and additions may be made therein, without departing from the spirit and scope of the present invention, with the scope of the present invention being described by the foregoing claims.

What is claimed is:

1. A coupling device, comprising:
- a first connector with a first primary pin and a second primary pin, the first connector extending through a front face of the coupling device,
- a first recess and a second recess defined in the front face of the coupling device,
- wherein the first recess is configured to receive a first component selected from the group consisting of a fuse and a jumper,
- wherein the second recess is configured to receive a second component selected from the group consisting of a fuse and a jumper,
- wherein the first recess is closed when the first component is received in the first recess, wherein, when the first recess is closed, the first component forms part of a first electrical circuit with the first primary pin, and
- wherein the second recess is closed when the second component is received in the second recess, wherein, when the second recess is closed, the second component forms part of a second electrical circuit with the second primary pin, and
- wherein the first connector is a female connector.

2. The coupling device of claim 1, further comprising a first indicator and a second indicator, wherein the first indicator is configured to alert a user when the first electrical circuit is in an opened state, wherein the second indicator is configured to alert a user when the second electrical circuit is in an opened state.

3. The coupling device of claim 2, wherein the first component and the second component are both fuses, wherein the first indicator and the second indicator are both configured to alert a user when a fuse is blown.

4. The coupling device of claim 2, wherein the first indicator and the second indicator are LED lights.

5. The coupling device of claim 4, wherein the first indicator and the second indicator are red LED lights.

6. The coupling device of claim 1, further comprising:
- a third recess defined in the coupling device, wherein the third recess is configured to receive a third component selected from the group consisting of a fuse and a jumper,
- wherein the third recess is closed when the third component is received in the third recess, wherein, when the third recess is closed, the third component forms part of a third electrical circuit with a third primary pin.

7. The coupling device of claim 6, further comprising:
- a fourth recess defined in the coupling device, wherein the fourth recess is configured to receive a fourth component selected from the group consisting of a fuse and a jumper,
- wherein the fourth recess is closed when the fourth component is received in the fourth recess, wherein, when the fourth recess is closed, the fourth component forms part of a fourth electrical circuit with a fourth primary pin.

8. A coupling device, comprising:
- a first connector with a first primary pin and a second primary pin, the first connector extending through a front face of the coupling device,
- a second connector,
- a first recess and a second recess defined in the front face of the coupling device,
- wherein the first recess is configured to receive a first component selected from the group consisting of a fuse and a jumper,
- wherein the second recess is configured to receive a second component selected from the group consisting of a fuse and a jumper,
- wherein the first recess is closed when the first component is received in the first recess, wherein, when the first recess is closed, the first component forms part of a first electrical circuit with the first primary pin, and
- wherein the second recess is closed when the second component is received in the second recess, wherein, when the second recess is closed, the second component forms part of a second electrical circuit with the second primary pin, and
- wherein the first connector and the second connector extend about the same central axis.

9. The coupling device of claim 8, wherein the first connector is a female connector.

10. The coupling device of claim 8, wherein the first connector is a male connector.

11. A coupling device, comprising:
- a first connector with a first primary pin and a second primary pin, the first connector extending through a front face of the coupling device,
- a second connector,
- a first recess and a second recess defined in the coupling device,
- wherein the first recess is configured to receive a first component selected from the group consisting of a fuse and a jumper,
- wherein the second recess is configured to receive a second component selected from the group consisting of a fuse and a jumper,
- wherein the first recess is closed when the first component is received in the first recess, wherein, when the first recess is closed, the first component forms part of a first electrical circuit with the first primary pin, and
- wherein the second recess is closed when the second component is received in the second recess, wherein, when the second recess is closed, the second component forms part of a second electrical circuit with the second primary pin, and
- wherein the coupling device is configured to be secured to a DIN rail mount, the DIN rail mount being arranged on a side of the coupling device opposite the first connector, and
- wherein the first component is in electrical communication with a wire extending through a shell of a housing parallel to the front face.

12. A coupling device, comprising
- a first connector with a first primary pin and a second primary pin,
- a second connector,
- a first recess and a second recess defined in the coupling device,
- wherein the first recess is configured to receive a first component selected from the group consisting of a fuse and a jumper, wherein the second recess is configured to receive a second component selected from the group consisting of a fuse and a jumper, wherein the first recess is closed when the first component is received in the first recess, wherein, when the first recess is closed, the first component forms part of a first electrical circuit with the first primary pin, and wherein the second recess is closed when the second component is received in the second recess, wherein, when the second recess is closed, the second component forms part of a second electrical circuit with the second primary pin, and wherein the coupling device is configured to be secured to a panel, and wherein the second connector extends through a recess within the panel and is secured to the panel by a nut.

13. A coupling device, comprising a first connector with a first primary pin and a second primary pin, a second connector, a first recess and a second recess defined in the coupling device, wherein the first recess is configured to receive a first component selected from the group consisting of a fuse and a jumper, wherein the second recess is configured to receive a second component selected from the group consisting of a fuse and a jumper, wherein the first recess is closed when the first component is received in the first recess, wherein, when the first recess is closed, the first component forms part of a first electrical circuit with the first primary pin, and wherein the second recess is closed when the second component is received in the second recess, wherein, when the second recess is closed, the second component forms part of a second electrical circuit with the second primary pin, and wherein the first connector is configured to receive an M12 connector, and wherein the first connector is arranged between the first recess and the second recess.

* * * * *